United States Patent [19]

Coviello

[11] 4,203,011
[45] May 13, 1980

[54] COMPUTER CONTROLLED KEY TELEPHONE STATION SET

[75] Inventor: Frank A. Coviello, Peekskill, N.Y.

[73] Assignee: TIE/Communications, Inc., Shelton, Conn.

[21] Appl. No.: 870,225

[22] Filed: Jan. 17, 1978

[51] Int. Cl.² .............................................. H04Q 5/18
[52] U.S. Cl. ................................ 179/99 M; 179/99 P
[58] Field of Search ...................... 179/99, 84 L, 81 C, 179/84 C, 18 J

[56] References Cited

U.S. PATENT DOCUMENTS

| | | | |
|---|---|---|---|
| 3,843,845 | 10/1974 | Ridley | 179/99 |
| 3,935,396 | 1/1976 | Barsellotti et al. | 179/99 |
| 3,973,085 | 8/1976 | Shiff | 179/99 |
| 3,996,424 | 12/1976 | Agricola | 179/99 |
| 4,027,110 | 5/1977 | Takematsu | 179/99 |
| 4,046,972 | 9/1977 | Huizinga et al. | 179/99 |
| 4,061,887 | 12/1977 | Kasson et al. | 179/99 |

OTHER PUBLICATIONS

*GTE Automatic Electric Technical Journal*, vol. 14, No. 5, pp. 226-234. Jan. 1975 "The Type 17A Key Telephone System".

*Primary Examiner*—Gerald Brigance
*Attorney, Agent, or Firm*—Francis N. Carten

[57] ABSTRACT

A key telephone set is disclosed having a programmed digital computer which signals a central switching and control unit of a key telephone system of the status of a plurality of function switches and receives signals from the central switching and control unit that certain electrical connections and visual indicators in the key telephone set are to be initiated or controlled. Two independent audio communication circuits are provided in the key telephone set for interconnection to either the hybrid network of the handset or the built in speakerphone unit. Central office lines are accessed via individual function switches. Intercom calls are initiated via one function switch, and are answered hands-free via the speakerphone or are answered via the hybrid network. A wide range of features are signalled via the function switches and are visually monitored by means of visual indicators. The key telephone set may be used interchangeably with either dial pulse signalling units or tone signalling units.

25 Claims, 12 Drawing Figures

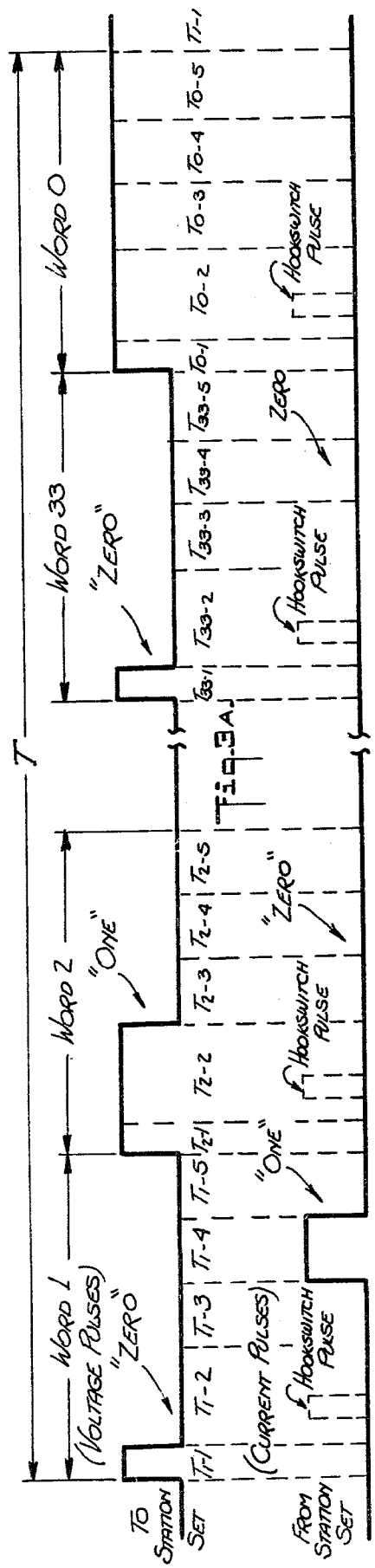
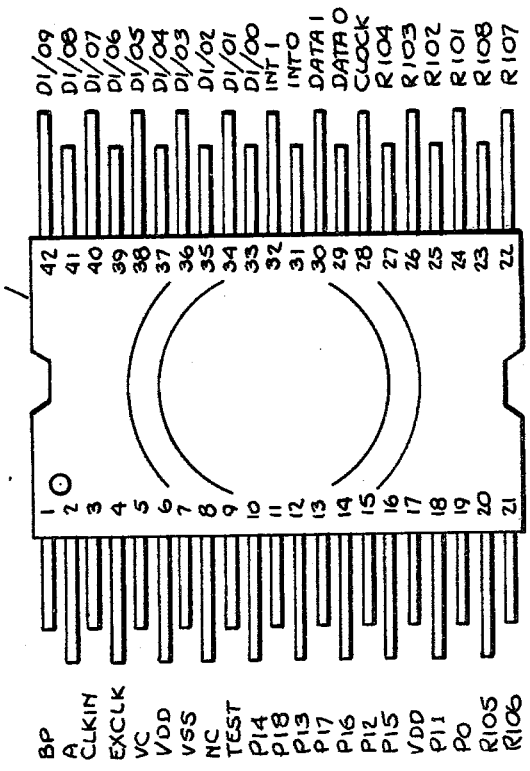
Fig. 3A.
Fig. 3B.
Fig. 4A.

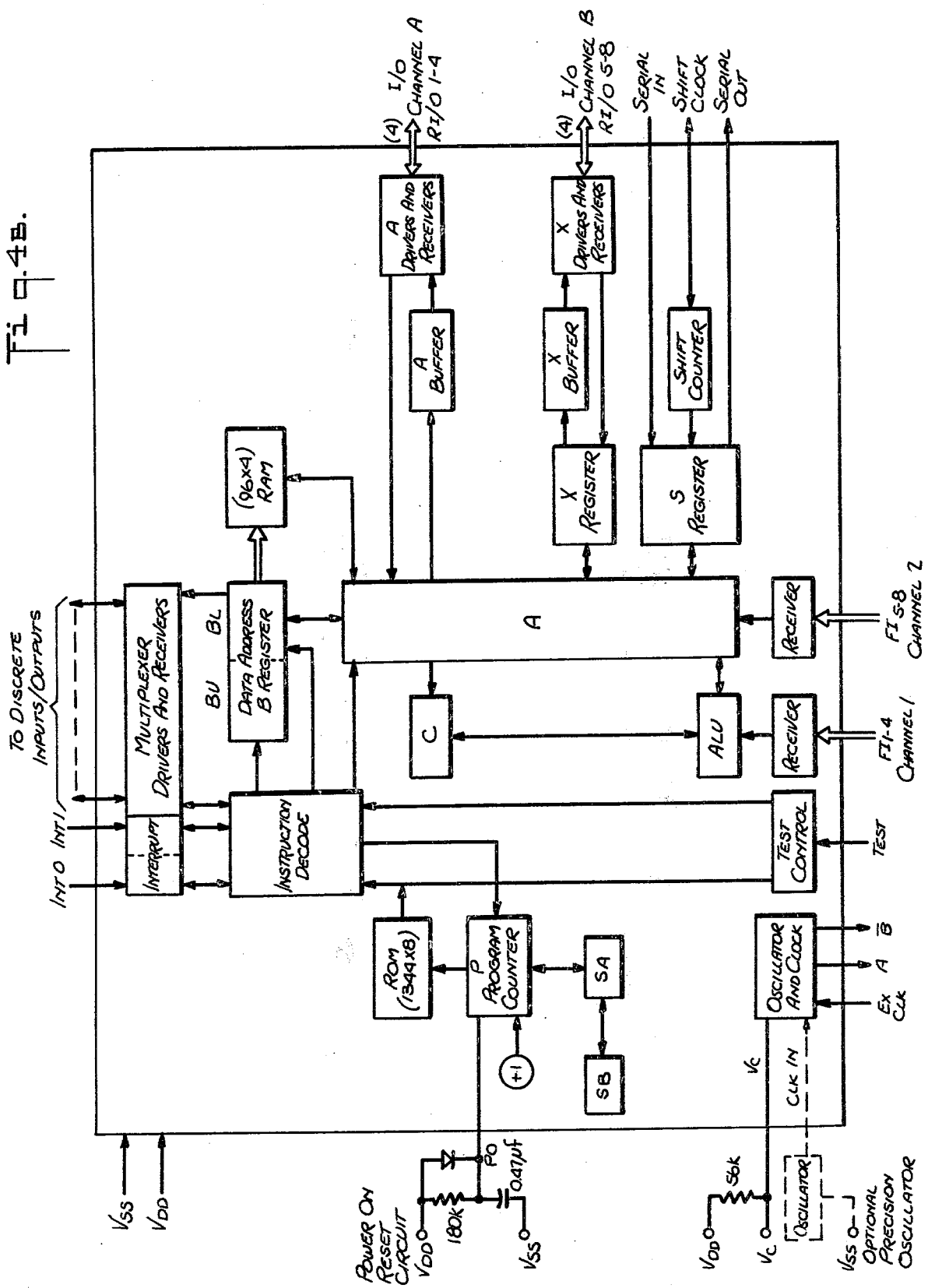

Fig. 2.

| | 0 | 1 | 2 | 3 | 4 | 5 | 6 | 7 |
|---|---|---|---|---|---|---|---|---|
| 1 | 0 | C.O. Line 1 / 4 | C.O. Line 2 / 8 | C.O. Line 3 / 12 | C.O. Line 4 / 16 | C.O. Line 5 / 20 | C.O. Line 6 / 24 | C.O. Line 7 / 28 |
| 2 | Background Music / 1 | C.O. Line 8 / 5 | C.O. Line 9 / 9 | C.O. Line 10 / 13 | C.O. Line 11 / 17 | C.O. Line 12 / 21 | C.O. Line 13 / 25 | Page / 29 |
| 3 | Release Switches / 2 | C.O. Line 14 / 6 | C.O. Line 15 / 10 | C.O. Line 16 / 14 | C.O. Line 17 / 18 | C.O. Line 18 / 22 | / 26 | Do Not Disturb / 30 |
| 4 | Hand Set On Cradle / 3 | Hold / 7 | Privacy Release / 11 | Flash / 15 | Speaker Phone On/Off / 19 | Hot Line / 23 | Intercom Answer / 27 | Intercom Call / 31 |

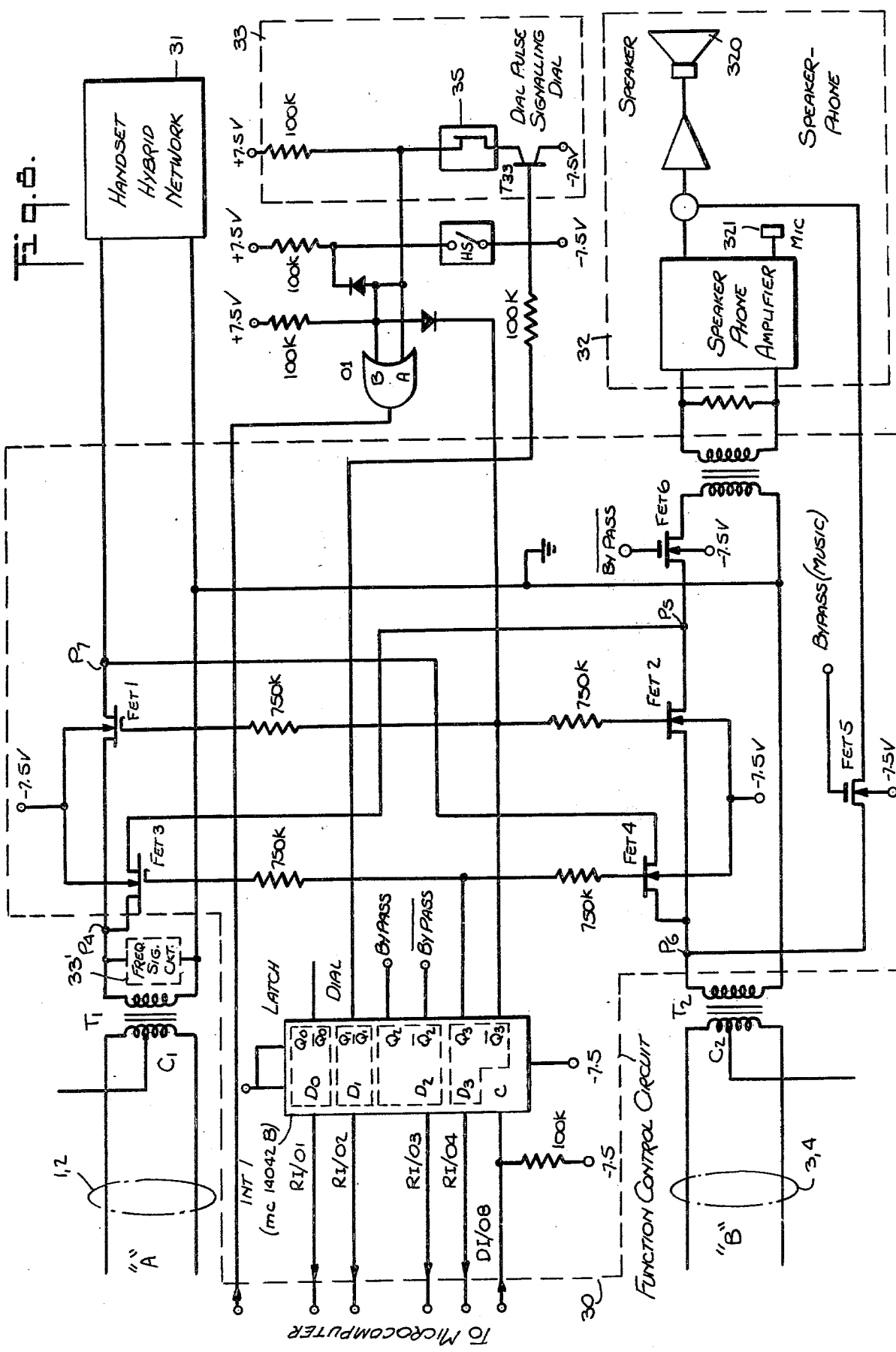

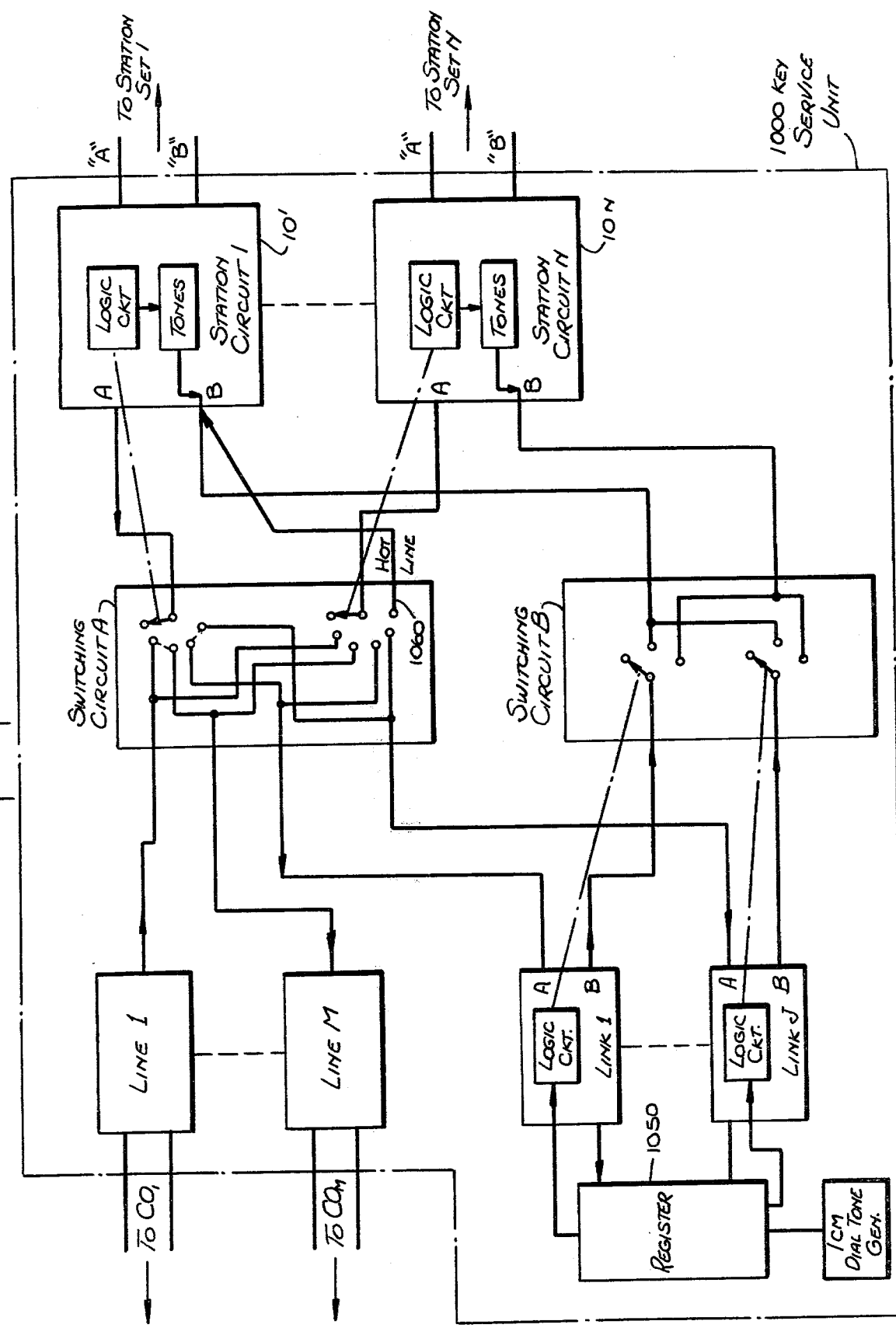

COMPUTER CONTROLLED KEY TELEPHONE STATION SET

BACKGROUND OF THE INVENTION

Prior art key telephone systems have been developed whereby a particular telephone station set has the capability of direct access or connection to a plurality of lines or trunks connected to a central office. Key telephone systems have also been developed in which key telephone station sets may signal and communicate with other key telephone station sets in the system in a so-called "intercom" mode. In older systems these features are realized by terminating all of the line conductors for each of these lines, whether they be central office lines or intercom lines, directly at the station set, and providing a key or button for each line. The particular line to be used by the telephone station set is user accessed by depressing the key for that line. The depressing of the key physically creates an electrical connection between the station set and the conductors to that line. Additional keys have been provided for placing a line in a hold condition where a second line is to be connected to the station set in order to complete a call over the second line without disrupting the connection to the first line. Many other special services have also been provided in the past such as conference calling, exclusion and exclusion release, paging, etc.

As mentioned above, in the prior art key telephone systems, each line has been physically terminated at the station set with its plurality of conductors so that as many as fifty conductors have had to be cabled to a station set in order to control as few as six days on a set. With modern key telephone systems increasing the number of lines and system features which may be controlled at each station set, the number of conductors which must be cabled to each station set has become intolerably large.

In an attempt to reduce the number of these conductors, systems have been developed, and are known, where only a few conductors are cabled from a central control unit to each station set, whereby all of the previously known features are realized through the technique of time division multiplex signalling over a few conductors between the key service unit and the telephone station set. Such systems frequently employ a central computer which may be a central control unit or a key service unit (KSU) which may be a data processor or digital computer in order to communicate with each of the station sets connected to the system. Examples of these prior art systems which have used computerized key service units to control the key telephone systems are many.

For example, U.S. Pat. No. 3,691,310 describes an electronic key telephone system in which each telephone station set, regardless of the number of keys with which it may be equipped, may be connected to a local switching network via only a single pair of tip and ring conductors and a data channel. The data channel comprises four conductors over which time division multiplex signals are transmitted between each telephone station set and a key service unit. The prior art paper entitled, "The Modular Electronic Key Telephone System" by Knollman, Reynolds and Simon, published in the International Conference of IEEE (paper number 770-CP-254) describes a system in which key telephone station sets are connected to a key service unit by six conductors, two conductors of which are a tip and ring pair serving as a voice path. Two conductors serve as a digital transmission path from the key service unit (KSU) to the key telephone set, the final two conductors serving as a digital transmission path from the key telephone set to the key service unit. The Knollman, et al. paper describes a key telephone set having six keys or buttons in which a three bit code is assigned for each button. One code corresponds to the switch hook position, with other codes corresponding to the six keys. Each key is assigned a three bit code by which a data word is provided between the key service unit and the telephone station set. It is apparent that this procedure is acceptable for a key telephone station set with a small number of keys because the data word is of a manageable size. However, as service increases for a key telephone set where a large number of central office lines and features is desired, assigning a digital code for each button becomes unmanageable.

Therefore one object of this invention is to provide a key telephone set having a built-in processing means by which each key on the key telephone set may be interrogated and its status transmitted to the key service unit and whereby the processing means in the telephone set received messages from the key service unit regarding the lighting of visual indicators and the control over the telephone set.

It is a more specific object of this invention to provide a key telephone set having a stored program digital computer within it, whereby a stored program generates and receives the input and output signals between the telephone set and the key service unit and controls the electrical and physical status of the key telephone set.

An advantage of this invention in which the key telephone station set has a stored program computer built into it is that it may operate in a total key telephone system so that the following features may be provided: central office line selection; placing an accessed central office line on hold; privacy on a central office line; privacy release, the capability of having either a built in speakerphone or the hybrid network of the handset simultaneously connected via two independent audio frequency communication paths to the key service unit; means for the user of the telephone set to turn the built-in speakerphone on or off, dial selective intercom calling with privacy, the provision for answering an intercom call "hands free" or via the handset; and other features such as "hotline", "paging," "do not disturb," "flash," line identification, central office line conferencing, etc.

SUMMARY OF THE INVENTION

These objects and features are realized with the key telephone set of this invention by providing a built-in stored program digital computer and by providing at least one, but preferably two, means for converting sounds to audio frequency electrical signals and for converting audio frequency electrical signals into sounds. These conversion means are the hybrid network of the key telephone set handset and a built-in speakerphone unit. The audio frequency electrical signals are transmitted to a central switching and control unit, or key service unit (KSU) via at least one, but preferably two independent audio frequency communication paths or electrical conductor pairs.

The key telephone set of this invention also has a plurality of switches, each of which, when closed, produces a signal indicative of a desired key telephone service. These switches, preferably arranged in matrix form, are closed by keys on the face of the key telephone set. The status of each switch is monitored periodically by the stored program digital computer built into the key telephone set.

A plurality of visual indicating means, light emitting diodes (LEDs) in the preferred embodiment of the invention, are provided, each one associated with one (but not all) of the switches in order to provide a visual signal regarding the status of the key telephone service associated with the respective switches.

The built-in stored program digital computer or microcomputer is provided in the key telephone set which periodically monitors, according to a message format, the status of each function or line switch. The microcomputer generates a pulse during a time element of the word associated with the switch (each switch is associated with a particular key telephone function or line) in the message for transmission to the KSU. The microcomputer also receives message transmissions from the KSU, certain words of which contain telephone control signals, other words of which are associated with each function or line switch. The microcomputer, in response to the KSU messages, then issues commands regarding electrical control connections and regarding the illumination of the LED associated with a function or line.

The key telephone set of this invention is compatible with dial pulse signal generators (rotary dials or push button dial pulse generators) and with tone or frequency signalling units.

The physical details of the key telephone set as well as many of its unique features will be described in detail below after a brief description of the drawings which are used to illustrate the invention.

BRIEF DESCRIPTION OF THE DRAWINGS

FIG. 2 also functionally illustrates the means by which the communication paths and the logic circuitry are controlled in the key telephone station set.

FIGS. 3A and 3B illustrate the data format by which information is transmitted from the key service unit station set logic circuit associated with each key telephone station set. Periodic messages are transmitted in which time is divided into a series of words, each one of the words being associated with a control function or a particular key on the key telephone set. During certain time elements of the word, signals are applied from the key service unit to the station set; during certain other time elements of the word pulse signals are transmitted from the key telephone set to the key service unit.

FIGS. 4A and 4B respectively, show the diagram of the stored program digital computer residing in the key telephone set, FIG. 4A being a hardware illustration of the computer, FIG. 4B being a functional description of the computer with indications of the inputs and outputs leads to the functional parts of the computer.

FIG. 7 shows a key arrangement of eight columns and four rows in which the first column is designated "zero." The arrangement, in the form of a matrix, indicates the correspondence between the words of the multiplexed data transmitted between each telephone set in the key service unit and the physical switch matrix residing in the telephone set.

FIG. 8 illustrates the computer controlled electrical circuits used to connect the telephone handset and speakerphone of the two audio frequency communication paths.

FIG. 9 functionally illustrates how the KSU of the key telephone system in which the key telephone set of this invention operates and how the KSU switches key telephone sets to central office lines and performs switching necessary to interconnect two key telephone sets for an intercom call.

DESCRIPTION OF THE INVENTION

Figure 1:
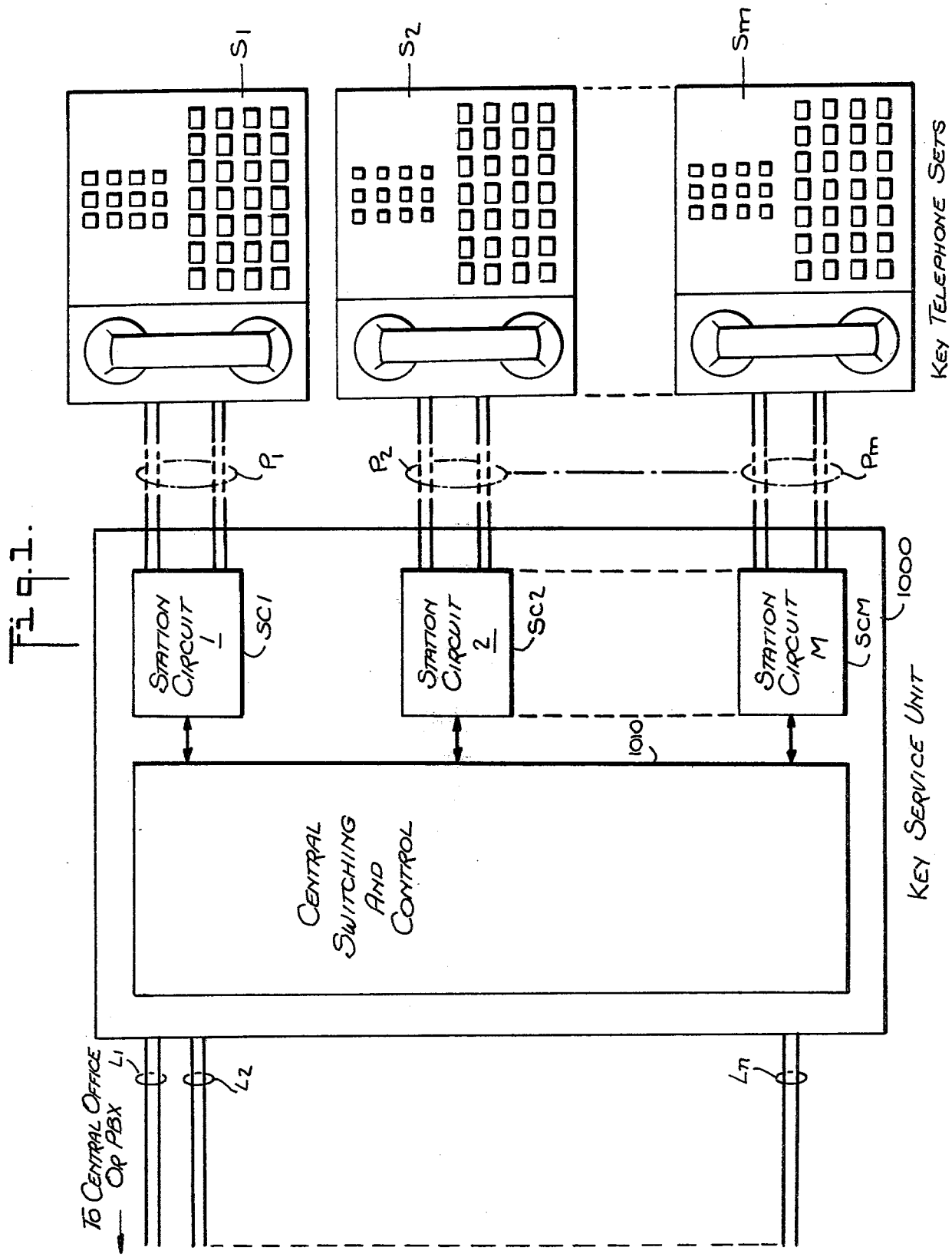
FIG. 1 illustrates the key telephone station set of this invention as it is used in a key telephone system in which a key service unit provides the interface between central office or PBX lines and key telephone sets and also provides switching between key telephone sets in an intercom mode.

FIG. 1 illustrates the system in which the computerized key telephone set of this invention is used. Station sets S1, S2 . . . SM are connected to a key service unit by communication paths $P_1, P_2 \ldots P_m$ to a key service unit 1000 via station circuits SC1, SC2, . . . SCM. The station circuits are connected to a central switching and control circuit 1010 which performs connections to central office lines L1, L2 . . . LN to the various key telephone sets, connects key telephone sets to other key telephone sets in a dial selective intercom mode, and generally provides supervisory and control functions for the key telephone set, some of which will be described in detail below.

Communication paths, $P_1, P_2 \ldots P_m$ are, in the preferred embodiment of this invention, four conductors which are used to provide simultaneously two independent communication paths, two way digital data transmission between each key telephone station set and the key service unit, and power transmission from the key service unit to each key telephone station. The preferred embodiment of the key telephone system (in which the computerized key telephone sets of this invention are elements of the system) uses four wire paths between key telephone sets $S_1, S_2 \ldots S_n$ and the key service unit 1000. Other conductor arrangements may be used, such as six or eight wire arrangements, known in the prior art.

Figure 2:
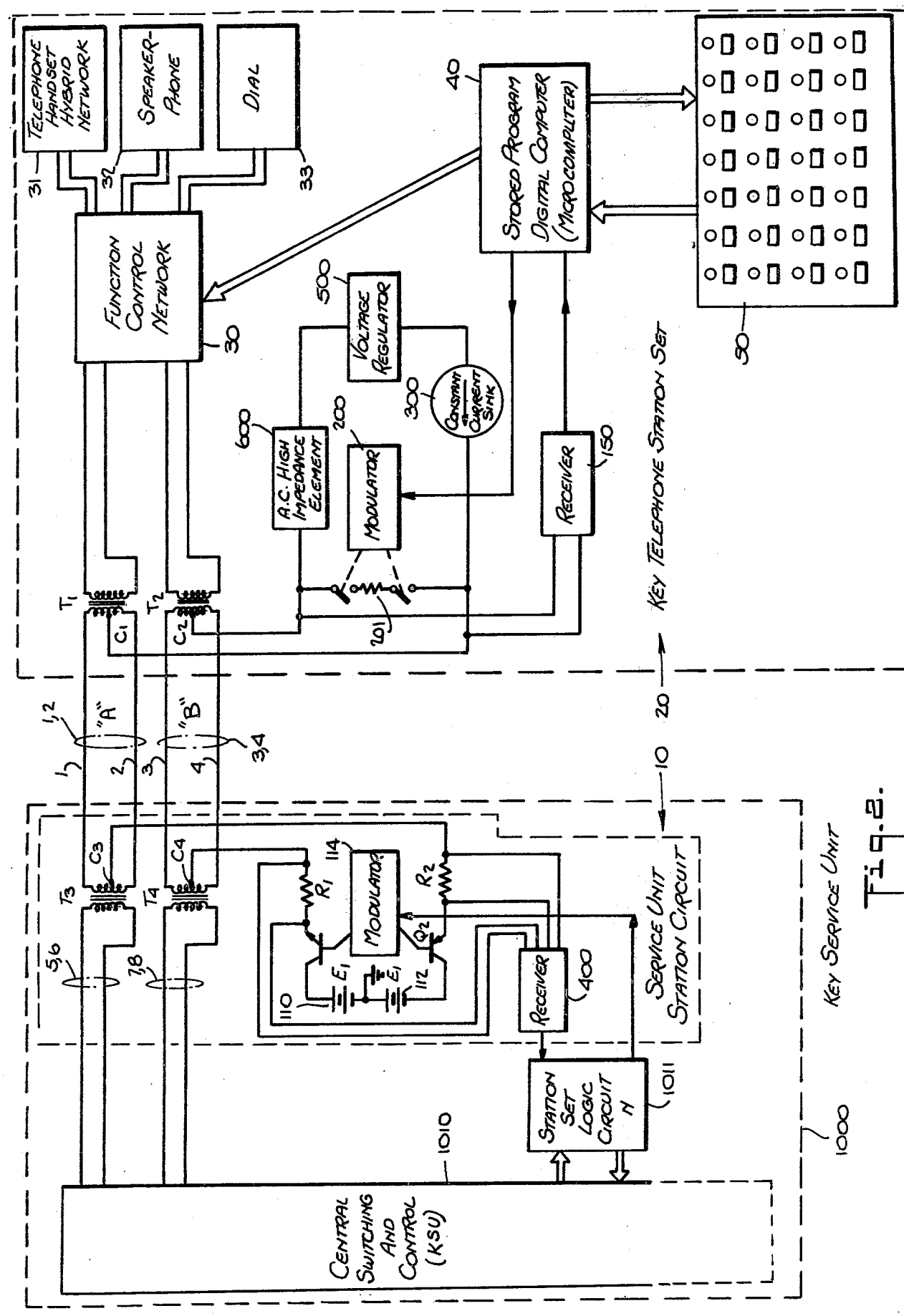
FIG. 2 illustrates the connection of a key telephone station set of this invention to a key service unit by means of four conductors thereby providing two communication paths and providing data signalling to and from the key service unit and the key telephone station set.

The four wire arrangement used in the preferred arrangement of the key telephone system is illustrated in FIG. 2, which shows in block diagram form the general aspects of any four-wire path, such as paths $P_1, P_2 \ldots P_m$ of FIG. 1. Four conductors 1,2 and 3,4 are shown connecting a station circuit 10 and a key telephone station set 20. Each conductor pair is terminated by a transformer. Transformers T1 and T2 terminate the conductor pair 1,2 and conductor pair 3,4 in key telephone set 20; transformers T3 and T4 terminate conductor pair 1,2 and conductor pair 3,4 in station circuit 10.

Each transformer has a center tap connection on the transformer winding connected to the conductor pair. Center tap connections are located at the telephone station set 20 (C1 and C2) and at the station circuit 10 (C3 and C4). A "phantom circuit" is created via the center tap connections C1 and C2, through the conductors 1, 2, 3, 4, to the center taps C3 and C4 or transformers T3 and T4. This arrangement creates a virtual third pair, known as a phantom pair, because in a closed circuit connected to center taps C3 and C4 of T3 and T4 and to center taps C1 and C2 of T1 and T2, the current applied at a center tap point will divide at the center tap connection, flow over two conductors, and be received in recombined form at the center tap at the other end.

Connected to both conductor pairs 1,2 and 3,4 at each end is circuitry necessary to create a complete communication channel. For example, at the key telephone station set 20, circuit pairs 1,2 and 3,4 are inductively coupled by transformers T1 and T2 to a function control network 30, controlled by a programmed digital computer 40. The function control network 30 provides a communication path to the telephone handset hybrid network 31 or to the speakerphone 32 of the key telephone station set 20. Connected to the side opposite pair 1,2 of transformer T3 in station circuit 10, is a conductor pair 5,6 for connection to a central office line. Connected to the KSU side of transformer T4 is a conductor pair 7,8 which may be connected via switching circuits in the control unit to other key telephone set conductor pairs. Thus, two independent voice paths via the four conductors 1,2,3,4 are provided in the circuit arrangement shown in FIG. 2.

Superimposed upon the voice paths such as $P_1$ are means for supplying power from the key service unit to the telephone set 20 via the phantom pair comprising the center tap connections C3, C4 through the balanced conductors 1,2,3,4 to the center tap connections C1 and C2 of transformers T1 and T2. D.C. voltage sources 110, 112, each of voltage $E_1$, are connected in series with resistors R1 and R2 to center tap connections C3 and C4. Digital data signals from the station circuit 10 are superimposed on the phantom pair with the D.C. level supplied by voltage sources 110, 112 by modulator 114.

In telephone station set 20, receiver circuit 150 responds to the D.C. voltage pulses appearing between center-tap connections C1 and C2 of transformers T1 and T2 and produces a data signal proportional to the data modulated by modulator circuit 114 in station circuit 10. The output from receiver 150 is applied to digital computer 40 in the station set 20 for controlling function control network 30 and switch and indicator unit 50 within the station circuit 20.

An A.C. high impedance element 600 is connected in series with voltage regulator 500 and constant current sink 300 to provide a circuit terminating phantom line 1,2 and 3,4 so as to substantially eliminate reflections on the line 1,2 and 3,4.

Data is transmitted from the station set 20 to the station circuit 10 over conductors 1,2,3,4 by applying data pulses to modulator 200, which switches a resistor 201 in and out of parallel connection with the phantom circuit connected to center taps C1 and C2, the current of which is being supplied by the station circuit 10. Because constant current sink 300 draws constant current from the closed circuit, and because resistor 201 is switched in and out of parallel connection with the constant current sink, current modulation in synchronism with the station set 20 data signals is applied on conductors 1,2,3,4.

The current pulses are sensed at the station circuit 10 by receiver 400 by comparing the voltages across resistors R1 and R2 which are proportional to current changes through them. The data produced by receiver 400 is in response to the current modulation imposed by modulator 200 in station set 20. Data signals received by receiver 400 are then applied to logic circuits within the central switching and control unit 1010 of key service unit 1000 to provide information with respect to the status of different switches of key telephone set 20. For example, the data being supplied by digital computer 40 within the station set 20 to modulator 200 includes the status of different line keys in the station set or the status of an indicator, the status of a hold key or privacy release key, etc.

Power is supplied from the station circuit 10 to the station set 20 by applying D.C. current from the D.C. sources 110, 112 via the phantom circuit to station set 20 where it flows through voltage regulator 500. Voltage regulator 500 divides and regulates the D.C. voltage supplied via the phantom circuit and applies the divided and regulated voltage levels to circuits within the station set 20.

FIGS. 3A and 3B illustrate a preferred format for the data pulses which are applied to conductors 1,2,3,4 by the station circuit 10 and the key telephone set 20. Each period of time T, typically 20.4 milliseconds, is divided into thirty-four 600 microsecond segments. The first word, called the "0th" word, is used as a synchronizing interval by the station set 20 digital computer to determine the start of the periodic word sequence or "message." The next 33 time segments, or words, are used in sending and receiving data between station circuit 10 and telephone set 20.

Each word is divided into five intervals. Although in general the intervals may be divided equally in time for each word, the preferred format in the key telephone system in which the invention is used requires that the third, fourth and fifth intervals each to be equal in time length, L, while the first interval is specified to be of ½ L time length. The second time interval is specified to be of 3/2 L time length. Time length L is specified to be 120 microseconds, so as a result, time intervals one through five, when summed, equal 5 L for a total of 600 microseconds. The data from the station circuit 10 to the station set 20 is applied during the first two of the intervals. Data returning from the station set 20 is applied during interval four. Intervals three and five remain idle.

Each word is designated to correspond to a particular function or line of the station circuit 20. The key service unit 1000 logic circuitry 1011 then scans each function once every 20.4 milliseconds and applies information via the data path to the station set 20 during the first and/or second interval of a word. The digital computer 40 in the station set 20 receives the data and uses it to control corresponding functions, such as connection of a speakerphone, or physical equipment, such as an indicator, in the station set. Current pulse information regarding the status of a particular function or element is transmitted during the fourth interval of each word from the station set 20 via the four conductor 1, 2, 3, 4 phantom circuit and is received in the station circuit 10 for use by the central switching and control circuit 1010 in making logic decisions for controlling the various elements and/or functions of station set 20.

FIG. 3A illustrates how information pulses from station circuit 10 to station set 20 are applied. The first voltage pulse in time slot "1" (e.g., $T_{1-1}$, $T_{2-1}$ ... $T_{33-1}$) is always present, thereby allowing digital computer 40 in station set 20 to determine exactly when a new word is beginning. In any word the station circuit 10 applies a "1" pulse during the time interval "2" by maintaining the voltage pulse high. That is, as illustrated for "Word 2" of FIG. 3A, the voltage pulse extends from $T_{2-1}$ through $T_{2-2}$ without returning to zero. In any word, the station circuit 10 applies a "0" pulse during the time slot "2" by removing the voltage pulse existing during the time slot "1." FIG. 3A illustrates how a "0" pulse is applied during Word 1 and Word 33, where during the intervals $T_{1-2}$ and $T_{33-2}$ no voltage pulse is applied.

FIG. 3B illustrates how current pulses from the station set 20 are impressed on the phantom circuit conductors 1,2,3,4 for reception by station circuit 10 logic circuitry. A current pulse applied during the fourth interval of a word, as in Word 1 of FIG. 3B, indicates that a "1" is being transmitted from station set 20 to control unit 10. The absence of a current pulse applied during the fourth interval of a word, as in word 33 of FIG. 3B, indicates that a "0" is being transmitted from station set 20 to station circuit 10.

In the key telephone system in which this invention is used each particular word of the time period T is used to provide information for the control of and/or status of line keys, indicators, hold keys, speakerphone circuit, etc. Although thirty-four words are shown in this specification for purposes of demonstrating the preferred embodiment of the data format of the key telephone system, any number of words may be used to correspond with the number of keys, indicators, and auxiliary circuits existing in a particular key telephone system.

Another feature of the data format used in the key telephone system relates to the manner in which information as to the status of the hookswitch and dial pulsing of the telephone station set 20 is transmitted to the key service unit 1000. As illustrated in FIG. 3B, during each word, short width current pulses during time interval two, are transmitted from the telephone station set 20 over the phantom circuit of conductors 1,2,3,4 to the key service unit 1000, whenever the hookswitch is closed. Time interval two is selected in the preferred embodiment of the invention so that the frequently occurring hookswitch current pulses are generated during the long time interval two of each word, which is 3/2 L of the time length. This design facilitates reception of the hookswitch pulses in the key service unit, because the relatively short hookswitch pulses do not overlap the ends of the time interval. A hookswitch signal is applied from the station set 20 under two conditions: (1) when the status of the telephone station set is "on-hook" (on-hook status occurs when the hookswitch is open and the speakerphone is not in operation) or (2) when a dial pulse from a rotary dial (or an electronic dial which generates dial pulses) associated with the telephone station set is generated.

Thus, when the station set has an "on-hook" condition, current pulses during the second interval of each word are transmitted and continue to be transmitted until the on-hook status is terminated (by the handset being taken "off-hook" or by the speakerphone being turned on). During dial pulse signalling, the current pulses are applied during the second interval of each word during, but only during, the generation of each dial pulse. The time period for each word of the data format, illustrated in FIG. 3A, is sufficiently short with respect to the length of a dial pulse that many "hookswitch" current pulses are transmitted, one each during each of the words of the data format. The presence or absence of current pulses received by the key service unit 1000, in the second time interval indicate that a dial pulse is being transmitted from the key telephone set.

Thus, the data format of the key telephone system, in combination with the four wire communication circuits, allows telephone station sets adapted for dial pulse signalling or telephone station sets adapted for frequency signalling to be connected to the key service unit by means of the communication circuit. Frequency signals are applied over one of the communication channels 1,2 or 3,4 while dial pulse signals are transmitted over the four conductor phantom circuits 1,2,3,4 by means of the data format as discussed above.

FIGS. 4A and 4B illustrate the digital computer 40 indicated in block diagram form in FIG. 2. FIG. 4A illustrates the external connections to the microcomputer; FIG. 4B illustrates the functional aspects of the microcomputer. The stored program which is stored in the read only memory (ROM) of FIG. 4B will be described below.

The preferred embodiment of the microcomputer in the key telephone set 40 and illustrated in FIGS. 4A and 4B is the model PPS-4/1 MM77 single circuit microcomputer system manufactured by Rockwell International Corporation and described in Document No. 29410-N42, Revision 1, July 1976, published by the Microelectronic Device Division of Rockwell International Corporation.

Microcomputer 40 receives data from receiver 150 (FIG. 2) on the "INT 0" lead, and applies signals to modulator 200 (FIG. 2) on the "Data O lead. Leads DI/00 to DI/09 and leads RI/01 to RI/04 are used to access the switch matrix and indicator matrix, schematically illustrated as key/indicator array 50 and the function control network 30, schematically illustrated in FIG. 2. Voltage input on lead $V_{DD}$ of microcomputer 40 is provided via a tap (not illustrated) from voltage regulator 500. Other leads on the microcomputer 40 illustrated in FIG. 4A are either not used or are not essential to the understanding of how the microcomputer functions to control the operation of the key telephone station set 20, in the key telephone system.

Figure 5:
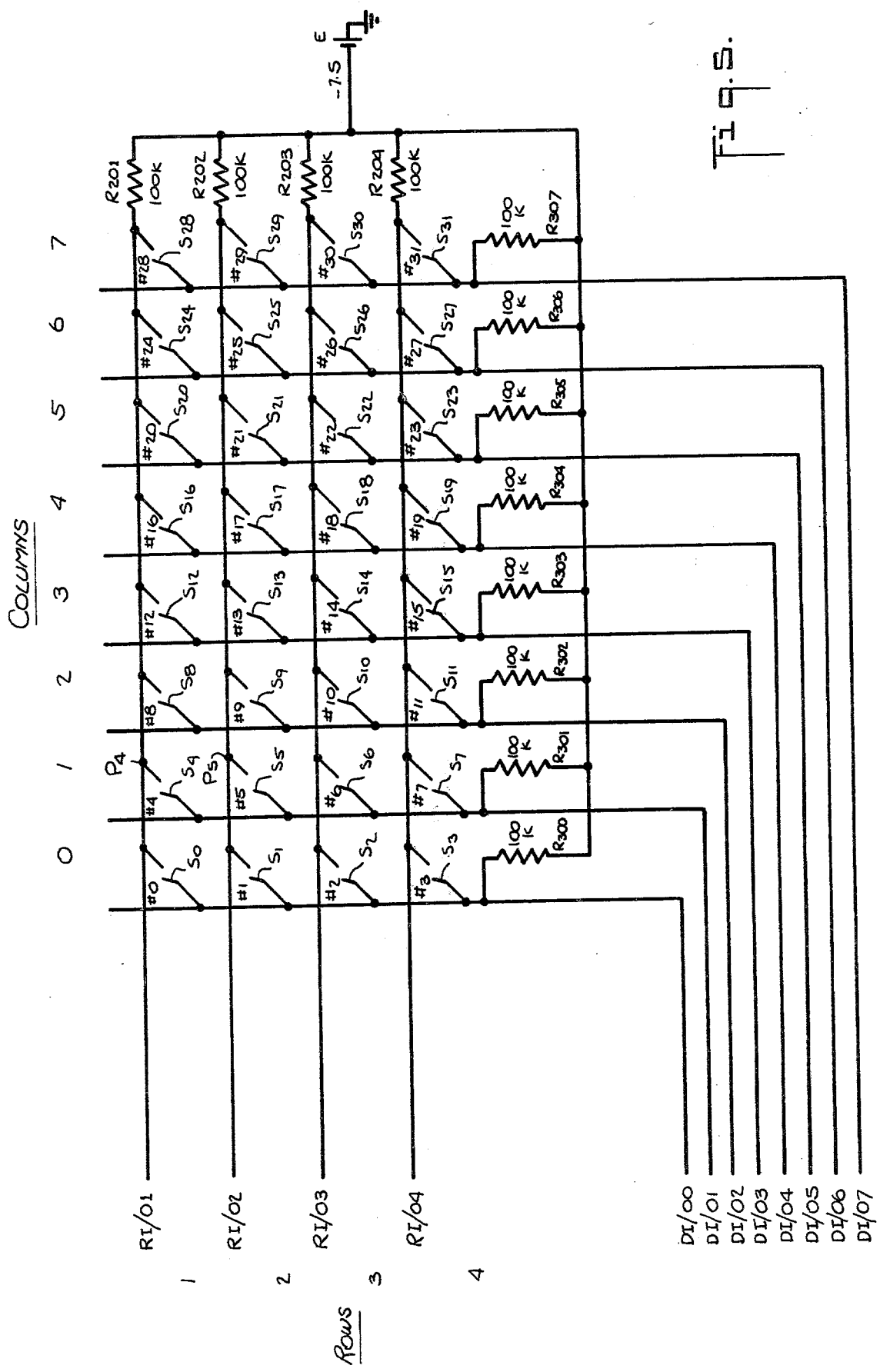
FIG. 5 shows a switch matrix for generating and transmitting information to the computer regarding the status of each of 32 switches arranged in eight columns and four rows.

FIG. 5 illustrates a switch matrix used in the key telephone set of this invention which is periodically monitored by the microcomputer 40. The switches are arranged in eight columns and four rows. The switches in columns one through seven are preferably non-locking switches; that is, when the keys associated with the switches are depressed, the switches only close while the keys are being pushed. Locking switches could, of course, be used in another embodiment of the telephone set of this invention. Switches in columns one through seven are arranged on a key panel 50 as illustrated in FIG. 2 and in FIG. 1. Switches in columns 1 through 7 are associated with central office lines and various functions which are incorporated in the key telephone set of this invention as indicated in FIG. 7. The switches in column 0 are not connected to the seven-by-four key panel 50 on the face of the key telephone instrument (FIGS. 1 and 2). The switches in column 0, may be locking switches, or may be non-locking, depending on their use, as will be explained in detail below.

The switch matrix of FIG. 5 is arranged to conform to the data format illustrated in FIGS. 3A and 3B. Of the thirty-three words available for transmission of information between the key telephone station set and the key service unit, thirty-two of the words are associated with one of the switches in the eight by four switch matrix. The additional word is used for control purposes as will be explained below. The function of the switch matrix of FIG. 5 is to present a signal to the microcomputer 40 in the key telephone set which can be recognized and transmitted to the key service unit as a request for a particular kind of service associated with one of the switches in the matrix.

During the word associated with switch $S_4$, the microcomputer monitors the voltages on inputs designated as RI/01 and DI/01 to determine if switch $S_4$ has been depressed. The status of switch $S_4$ is determined by microcomputer 40 during word 4, by applying a positive 7.5 volt strobe pulse on lead DI/01 while enabling lead RI/01. If switch $S_4$ is open, a $-7.5$ volt signal appears at point $P_4$, because no current path exists to drop the $-7.5$ volts of source E across the parallel resistors $R_{301}$ and $R_{201}$. If switch $S_4$ is closed and a $+7.5$ volt pulse on DI/01 is applied, the voltage at point $P_4$ is approximately $+7.5$ volts because the $-7.5$ volts of source E and the $+7.5$ volt pulse of DI/01 is dropped across resistors $R_{201}$ and $R_{301}$. Thus, during word 4, if switch $S_4$ is closed, a $+7.5$ volt signal is applied on lead RI/01 and is sensed by microcomputer 40 for transmission of a pulse during time segment 4 of word four, as will be explained in detail below. During word five, a $+7.5$ volt pulse on lead DI/01 remains, but lead RI/02 is enabled to sense whether or not the $+7.5$ volt pulse appears at point $P_5$. All switches are sequentially sensed periodically according to the format of FIG. 3. According to the above described switch sensing scheme, microcomputer 40 can obtain input information regarding the status of line and function switches of the key telephone set for processing and transmission to the key service unit.

Figure 6:
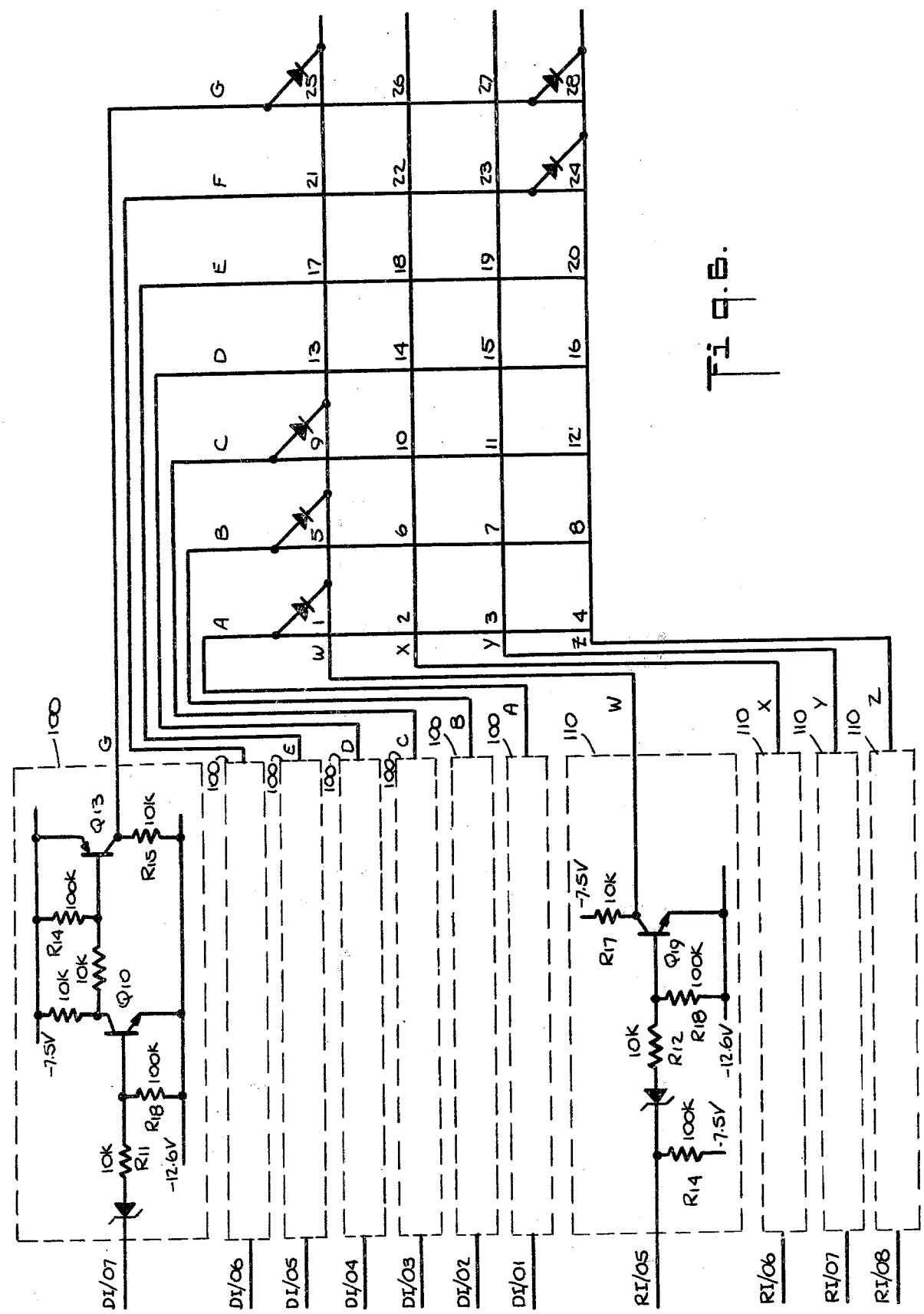
FIG. 6 shows an indicating circuit arrangement whereby seven columns and four rows of indicators are controlled by driver circuits responsive to outputs of the computer in the key telephone set.

FIG. 6 illustrates the LED matrix used to indicate the status of each of the functions associated with switches of column 1 through 7 and rows 1 through 4. Light Emitting Diodes (LEDs) are used in the preferred embodiment of this invention because of their extremely low power requirements, but other embodiments of the visual indicator matrix could possibly employ small light bulbs or equivalent devices. If it is desired to illuminate, for example, the indicator associated with switch 4 (i.e., a key marked C.O. Line 1-see FIG. 7) the LED of column "A" and row "W" of FIG. 6 is illuminated during, but only during, word 4 of the data format. For example, the microcomputer receives information from the key service unit that C.O. line 1 is active, and that the indicator associated with that line is to be illuminated. During word 4, a pulse is received during the second time segment (e.g., $T_{4-2}$, FIG. 3A). The microcomputer responds by generating pulses on leads RI/05 and DI/01. These pulses from the microcomputer, each of $+7.5$ volts in value are transformed by isolating circuits 100 and 110 to be $-7.5$ volts on lead A and $-12.6$ volts on lead W. Application of these voltages to LED 1 of FIG. 6 causes current to flow through it for the duration of word 4.

It should be noted that even though LED 1 is pulsed only during word 4, the period T of the data format assures that it is illuminated once each period, or once each 20.4 milliseconds or approximately fifty times each second. To the human eye, the indicator appears to be steadily lit, even though in reality it is being pulsed for only about 600 microseconds out of a period of 20.4 milliseconds. It is seen that the method and apparatus of illuminating switch or key indicators of the key telephone set yields tremendous economies of power, because each indicator need not be continuously powered, yet to the human eye, the indicator appears to be continuously illuminated.

FIG. 7 illustrates the functions assigned to each of the switches of the switch matrix illustrated in FIG. 5. Assignment of functions to switches is easily changed, because the key of column 1 and row 4 (word 4) may be assigned to any central office line connected to the key service unit. Likewise, the key of column 1, row 4 (word 7) could be assigned a function other than the "hold" function indicated in FIG. 7. For example, if it were desired to designate the key or switch of column 6, row 3 as the "hold" key, all that would be required would be to label key 26 as hold, remove the label from key 7 and designate word 26 of the data format to be associated with the hold function. Each of the functions designated in FIG. 7 will be described in detail below for an illustrative operation of the key telephone of this invention.

FIG. 8 illustrates the function control network 30 (see FIG. 2) which controls the handset hybrid network 31, speakerphone 32, and dial 33. In normal use, the key telephone set 20 of this invention connects its handset hybrid network 31 (hereinafter "handset") via the "A" path or conductors 1,2 through the key service unit switching and control unit to a central office line designated by one of the C.O. keys illustrated in FIGS. 5 and 7. Path "B" is used ordinarily when an incoming call is being received by the key telephone set from another key telephone set in the key telephone system. An intercom call is received and answered at the key telephone set via path "B" to speakerphone 32 where the key telephone set user may receive the caller's voice over built-in speaker 320 and transmit the user's voice via microphone 321, both of which are components of speakerphone 32.

In normal operation (handset 31 connected to "A" path) the microcomputer 40 outputs a pulse on lead DI/08 which is connected to the "C" input of integrated circuit MC 14042 B (manufactured by the National Semiconductor Corporation), hereinafter designated the "latch" circuit. When a pulse is present on DI/08, the voltage state at RI/01–RI/04 is transferred and held at outputs 0–3 of the latch circuit (Q & $\overline{Q}$). No input on lead C via microcomputer lead DI/08 causes the $Q_3$ output lead to be low, and the $\overline{Q}_3$ output lead to be high from this latch circuit. A high output on $\overline{Q}_3$ causes field effect transistors FET 1 and FET 2 to conduct, thereby connecting handset 31 to the "A" path and speakerphone 32 to the "B" path. Field effect transistors FET 3 and FET 4 are turned off because the output on lead Q3 is low.

When the key telephone set user desires to use the built-in speakerphone 32, he may depress his speakerphone on/off key (see FIG. 7, key 19) which, as explained below in the description of the operation of the key telephone set, causes a $+7.5$ input pulse on RI/04 at the time of the pulse on DI/08 from microcomputer 40, which causes $\overline{Q}_3$ to be low and Q3 to be high. When $\overline{Q}_3$ is low, FET 1 and FET 2 are cut off, disconnecting handset 31 from the "A" path and speakerphone 32 from the "B" path. Simultaneously, when $Q_3$ is high, FET 3 and FET 4 are turned on, connecting points P4 and P5, and P6 and P7, with the result that handset 31 is connected to the "B" path, speakerphone 32 is connected to the "A" path.

The key telephone set of this invention may be used interchangeably with dial pulse signalling dials (as indicated in FIG. 8 by circuit 33) or with frequency signalling dials (as indicated in FIG. 8 by circuit 33'). Frequency dial signals are applied over path "A" in the same manner as prior art telephones. The dial pulses are applied, not via paths "A" or "B," but as a sequence of "hookswitch" pulses transmitted to the key service unit to be reconstituted as central office dial pulse signals or to be used internally for intercom signalling. The dial pulse signalling circuit 33 is controlled via an output from microcomputer 40 via the latch circuit which continuously applies an enabling voltage to transistor T33 during a certain time after the telephone handset has been picked up or after the speakerphone has been enabled, etc.

As shown in FIG. 8, during the make period of breaker 35 (normal operation when no signalling is being conducted), if transistor T33 is conducting (i.e., the dial is enabled via latch output Q1), input A of "OR" gate 01 will be driven to −7.5 V. Input B of OR gate 01 will also be at −7.5 V due to the "off hook" status of station set hookswitch HS. Thus, no output signal is applied to the microcomputer via lead INT 1 and no hookswitch pulses are applied to the KSU in the words of the data message.

During a dial break period (e.g., breaker 35 is open) input A of OR gate 01 is driven to +7.5 V via resistor R901; thus the output of OR gate 01 will be at +7.5 V. The high voltage applied to microcomputer input lead INT 1 via the output of OR gate 01 causes the microcomputer to transmit hookswitch signal pulses during each word of the message as long as the dial pulse breaker 35 is open. Of course if the handset is on hook, the hookswitch HS is open, a high output via input B of OR gate 01 is applied to lead INT 1, and the microcomputer continually transmits hookswitch pulses to the KSU.

As indicated previously, a hookswitch signal during interval two of each word is applied from the microcomputer 40 via the phantom circuit to the key service unit under two conditions: (1) when the status of the telephone station set is "on hook" (when a hookswitch HS is open and the speakerphone is not operational) or (2) when a dial pulse from a rotary dial is generated. When the user picks up the handset, the hookswitch HS closes and hookswitch pulses are terminated, except during dialing, when pulses are generated by periodically opening a switch, in the same manner as the hookswitch is opened when the handset is "on hook".

Background music is applied to the speaker 320 of the key telephone set from the key service unit via the "B" path. When the switch 1 of the switching matrix illustrated in FIG. 7 is depressed, the microcomputer 40 sends a signal in word 1 of the data format to the key service unit indicating that background music is desired at the key telephone set, whereupon the key service unit applies background music to path "B" of the key telephone set requesting music, and applies a pulse in time segment 2 of word 1 indicating to the microcomputer that the music bypass circuit of FIG. 8 is to be activated. When the Q2 of latch circuit is high, the music signal on path B is applied directly to the speaker 320, yet the microphone 321 is rendered inactive because of the low signal on $\overline{Q_2}$ to the Bypass lead connected to the gate FET 6.

FIG. 9 schematically illustrates the key service unit 1000 used in the key telephone system in which the key telephone set of this invention is used. Station circuits $10^1 \ldots 10^n$ are shown, each of which are connected via "A" and "B" paths to a specific telephone station set by only four leads as illustrated in FIG. 2. Central office calls are received and originated via the "A" transmission pair of the key service unit 1000 to the key telephone set 20. When a call is originated in a station set, such as station set 1, a line key is selected designating a particular central office line over which the call is to be conducted. The logic circuit of station circuit 10' associated with station set 1, controls switching circuit A which connects the desired central office line to path "A" of station circuit 1.

If the user of station set 1 originates an intercom call to one of the other telephone station sets in the key telephone system, the call originates on the "A" path of station set 1, whereupon the switching circuit A scans the link circuits, LINK 1 ... LINK J, until an idle link is found. The first available link is seized by the calling telephone set. The identity of the called party (in the form of a digital dial sequence) is passed to the common register circuit 1050 which controls the "B" path from the seized link circuit to connect in switching circuit B to the "B" path of the called telephone. Certain telephone station sets may be provided with a "hot line" connection 1060, as indicated for station circuit N whereby the "A" path of station circuit N is connected directly to the "B" path of station set 1 when the switch in switching circuit A is instructed via the logic circuit in station circuit N that a hot line connection is to be made.

Although FIG. 9 describes the preferred embodiment of a Key Service Unit serving as a central control and switching circuit by which the key telephone sets of this invention are integrated into a working system, other central control and switching circuits could be used to control the key telephone sets. A PABX switching machine is but one example of such a machine.

Now that the details of the circuitry and hardware have been described, a description of the stored program of the digital computer in each key telephone set of this invention will be described. A description of the program follows with the aid of a flow chart shown in FIG. 10, after which a listing of the actual program used in the preferred embodiment of this invention will be presented.

Figure 10:
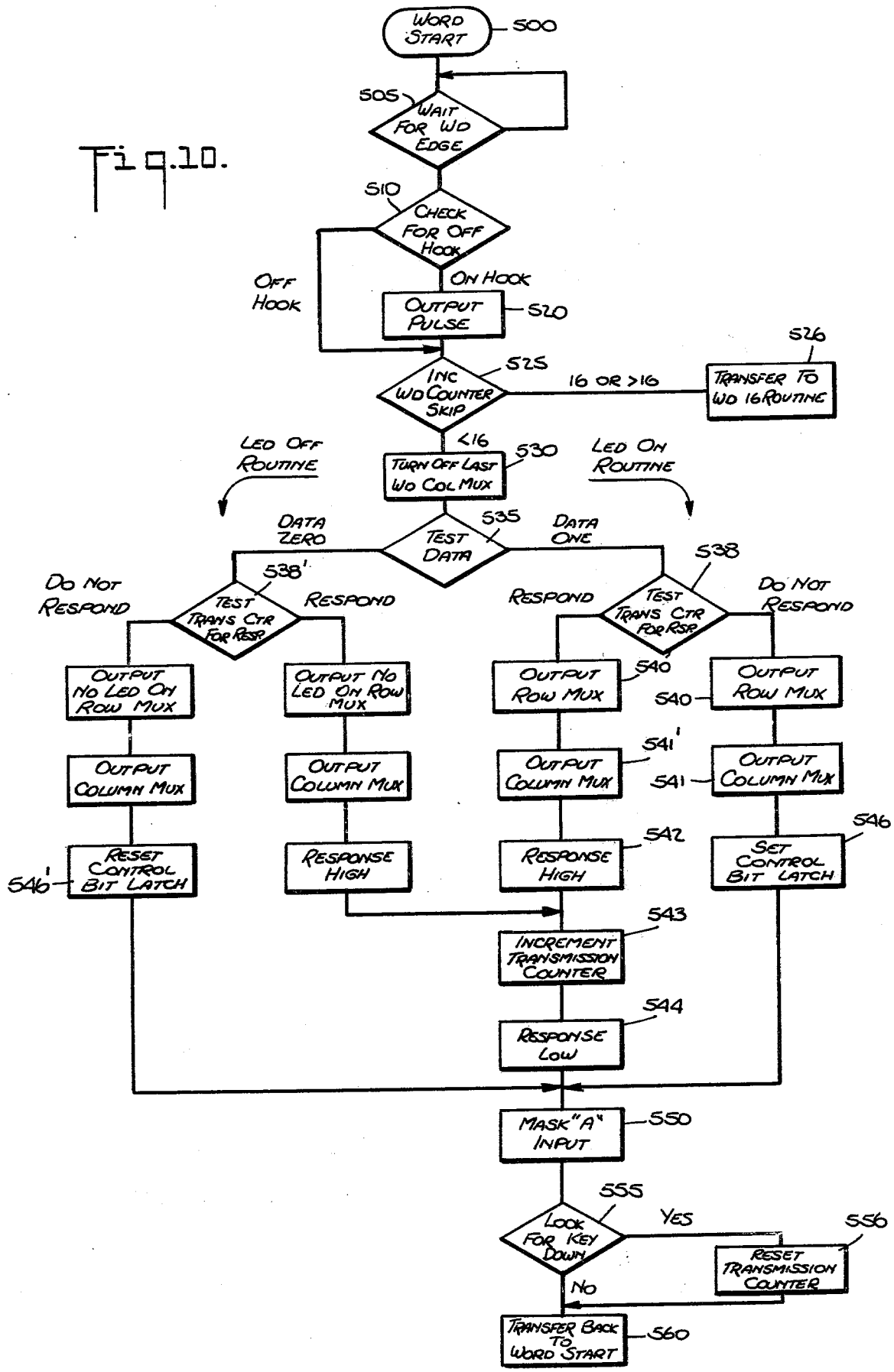
FIG. 10 illustrates in flow diagram form a major portion of the stored program residing in accessable memory of the microcomputer of each key telephone set of this invention.

The flow chart of FIG. 10 describes the action of the program during its operation for a word such as words 4 through 31 as indicated in the functional designation of words 4 through 31 in FIG. 7. As indicated in FIGS. 3A and 3B, during each of words 4 through 31 a word start pulse is transmitted to the key telephone set microcomputer in the first element of time. A signal is transmitted or not transmitted during the second interval of time to indicate whether or not the LED associated with that word is to be illuminated. The microcomputer sends a pulse in time element 4 of the word to the key service unit to indicate that a switch associated with the word is depressed.

The program is entered as indicated by step 500 of FIG. 10 and passes a waiting step 505 where it tests for an input signal indicating the start of time T1, for example, in word 4. When the start of time T1 is indicated by the arrival of the pulse, the program moves to step 510 which checks for "on-hook" status. As indicated previously in connection with the description of FIG. 3B and again of FIG. 8, "off-hook" is taken to mean a logical status, and not merely the condition of the hook switch controlled by the handset on the cradle of the telephone. In the key telephone set of this invention, a logical "off-hook" occurs if the handset is off the cradle or the speakerphone has been turned on, and if a dial pulse is not being generated by a rotary dial. The logical condition of "off-hook" is input to the microcomputer. Step 510 of the program assesses the off-hook condition. If the on-hook condition is present, the step 520 transmits a pulse during time element 2. During dial pulse signalling, by means of a rotary dial or equivalent, the output pulse step 520 of the computer program will be issuing sequences of off-hook condition (no pulses) and on-hook condition (pulses). Thus, the microcomputer transmits this hook bit in segment T2 of the data format for every word in which this dial pulse is present.

Step 525 increments the word counter in the microcomputer random access memory in order that the current word number may be determined. If the word count is 16 or greater, a transfer to step 526 is performed. The "word 16 routine" of step 526 refers to a sequence of instructions practically identical to those of FIG. 10, but stored in a different location of the random access memory (RAM) of the computer.

The computer program functionally described in FIG. 10 is a "real-time" program which is required to accomplish its computations within the word time length of the data format. The time to perform all the computational steps which should be ideally performed is greater than the given word length time. For that reason, during word N (i.e., in this case word 4) it is convenient at this particular time (step 530 of the flow chart) in the program to turn off the last word's column multiplex signal.

Step 530 occurs in time T2 of the data format. If a pulse is present during T2, a command is present to turn the LED associated with word N on. If the pulse is not present, the LED will not be turned on. Step 535 tests whether or not a pulse is present during time T2. Data is input to the microcomputer 40 from the KSU on lead "INT O" of FIGS. 4A and 4B.

If a pulse is sensed in step 535 during time element T2 (the "DATA ONE" path is chosen), steps must be taken to turn the indicator, or LED in this embodiment of invention, on. Because the computer program must operate in real time, a decision must be made regarding whether a response to a key-down signal from the switch matrix is received. A transmission counter is tested in step 538 of the flow chart. The transmission counter increments itself, once set by a switch closing associated with a particular word, until eight periods of transmission after a switch is released. Step 538 of the flow chart indicates the point in the computer program where the counter is tested. A count of eight must be in the counter in order for the "do not respond path" to be taken.

Next, the program must turn the LED on for the word. Thus, the row multiplex address for the LED associated with the word, in this example word 4, is energized in step 540 or 540'. Next, the column multiplex address for the LED associated with the word 4 is energized in step 541 or 541'.

After steps 541' or 541 are performed, the microcomputer must transmit a pulse back to the key service unit if the "respond" path is being taken. After the pulse is sent to the key service unit, the transmission counter is incremented in step 543. After the time increment of T4 of word 4 has passed, the output response to the key service unit is removed (or returned to the low value) in step 544.

The step labelled, mask "A" input, step 550, insures that only the switch associated with word 4, or the key and switch in column 1, row 1 is tested. All other rows and columns, except column 1, and row 1 are blanked, or masked. Step 555 is used to read the switch output. If the switch is down, the transmission counter is reset to zero in step 556. As explained above, for the next eight messages word 4 will transmit a pulse in its T4 time segment to indicate that the switch associated with word 4 is down. The purpose of sending the message for eight messages provides a means to insure that a received pulse in a word at the Key Service Unit is actually a signal, and not a noise pulse. If the switch is not down, the program is transferred, in step 560, back to the top of the flow chart, to wait for the next word.

In the "Do Not Respond" path after steps 535 and 538, step 546 is reached labelled "Set Control Bit Latch." During control words 0–3, pulses during T2 are sent from the key service unit to indicate that a latch signal is to be generated to control switches in the key telephone set. Because of the real time nature of the program, there is not enough time to accomplish the latch generation task. A control bit latch is stored as indicated in step 546 so that during the synchronization word of the message (see FIG. 3A—"Word O"), it can be strobed into the external control latch (FIG. 8) to operate the switches in the key telephone station set. Thus, a pulse in the T2 segment of words 0–3 is stored as a control bit latch for that word, the actual operation of the switch associated with the particular control word being delayed until the synchronization word of the following message. It will be noticed that if there is no data in T2 of the control word, the "Data Zero" path is followed and the control bit latch is reset in step 546' as shown in the left hand portion of FIG. 10.

An explanation of the "LED Off Routine" portion of the flow chart of FIG. 10 requires an assumption that the program has progressed during any word to the step 530 labelled as "Turn Off Last Word Column Multiplex." This is done because if the LED associated with the previous word was turned on, it is now time (during the following present word) to turn off the LED associated with that word. Thus, if an LED is turned on during a word, it is energized only for the duration of one word time interval, and is refreshed each message for 1/34th of the total messsge time. If the data in interval T2 is zero, step 535 transfers the program to the steps shown to the left of FIG. 8.

As explained previously for step 538, a decision is made in step 538' regarding whether or not a pulse will be generated during interval T4 of the word for transmission back to this Key Service Unit to indicate that the switch associated with that word has been closed. If the transmission counter has a count less than eight, a pulse should be generated and the "Respond" path is followed. If the count is equal to eight, no pulse will be transmitted to the Key Service Unit, and the "Do Not Respond" path is followed.

As previously explained, the program proceeds to step 550 to determine whether or not the switch associated with the word is closed. If the switch is closed, the transmission counter is set to zero again as indicated by step 556. A transfer to the start of the program is accomplished in step labelled 560.

The "Word 16 Routine" of step 526 is a program practically identical to that described by the flow chart of FIG. 10, but is stored in a different part of the Random Access Memory of the microcomputer 40. The "Word 16 Routine" is necessary because of the limited storage capacity of the microcomputer memory. The "Word 16 Routine" transfers control of the microcomputer to a routine stored in another part of memory which acts as the control program during words 17-31. This program is functionally identical to that described in FIG. 10, except that it is arranged differently in microcomputer memory to cooperate with the internal configuration of the microcomputer memory.

The "Word 17-31 Routine" transfers to a "Sync" routine. The Sync routine checks the data received from the KSU to determine that the key telephone set microcomputer is operating in time-synchronism with the KSU. If not in synchronism, the Sync routine causes the microcomputer to delay continuing until the sync pulse is received. During the sync word, control bit data on leads RI/01-04 (see FIG. 8) are applied to the latch circuit.

The program listing of Table I which follows is stored in microcomputer 40 of the preferred embodiment of this invention. The ROM address with machine operation code, and the assembly language listing of the program is included in Table I. The assembly language instructions are explained in detail in the manufacturer's publication, "MM77 System Product Description," Document No. 29410-N42, July 1976, published by Rockwell International Corporation, pp. 5-8.

TABLE I

PROGRAM LISTING

| COLUMN I | | COLUMN II | |
|---|---|---|---|
| Machine Code (address, command) | Instruction Code (assembly language) | Machine Code (address, Command) | Instruction Code (assembly language) |
| | | ORG | #080 |
| 0040 17 SYST | LB #7 | 0080 00 LTOF | NOP |
| 0060 71 | ROS | 00A0 00 | NOP |
| 0050 00 | NOP | 0090 00 | NOP |
| 0048 00 | NOP | 0088 5C | X |
| 0044 00 | NOP | 0084 0A | EOB #2 |
| 0042 03 | INTOH | 0082 76 | LBA |
| 0061 C1 | T WASYN | 00A1 2B | SKBF |
| 0070 97 | TM D7 | 00B0 3C | TL OFNR |
| 0058 03 | INTOH | 0098 C9 | |
| 004C C1 | T WASYN | 008C 4F | LAI #F |
| 0046 97 | TM D7 | 0086 79 | XAX |
| 0063 03 | INTOH | 00A3 0A | EOB #2 |
| 0051 C1 | T WASYN | 0091 40 | LAI #0 |
| 0068 B3 | TM D11 | 00A8 74 | XAS |
| 0054 48 | LAI #8 | 0094 50 | L |
| 004A 74 | XAS | 008A 0A | EOB #2 |
| 0065 00 | NOP | 00A5 7A | XAB |
| 0072 00 | NOP | 00B9 70 | SOS |
| 0079 40 | LAI #φ | 00BC 7A | XAB |
| 007C 10 | LBL #5φ | 009E 00 | NOP |
| 005E 0D | | 00AF 41 | LAI #1 |
| 006F 7E | A | 0097 7E | A |
| 0057 09 | EOB #1 | 008B 5C | X |
| 004B 5C | X | 0085 49 | LAI #9 |
| 0045 50 | L | 00A2 74 | XAS |
| 0062 7E | A | 00B1 07 GO3 | SAG |
| 0071 11 | LBL 51 | 00B8 50 | L |
| 0078 0D | | 009C 77 | COM |
| 005C 7E | A | 008E 7B | IOA |
| 004E 09 | EOB #1 | 00A7 6F | AISK #F |
| 0067 5C | X | 0093 CB | T GO4 |
| 0053 50 | L | 0089 27 | RB 4 |
| 0049 7E | A | 00A4 00 | NOP |
| 0064 12 | LBL #52 | 0092 3C | TL SRT1 |
| 0052 0D | | 00A9 FF | |
| 0069 7E | A | 00B4 00 GO4 | NOP |
| 0074 09 | EOB #1 | 009A 00 | NOP |
| 005A 5C | X | 00AD 3C | TL SRT1 |
| 006D 50 | L | 00B6 FF | |
| 0076 7E | A | 00BB 4E CTAU | LAI #E |
| 007B 13 | LBL #53 | 009D 5C | X |
| 005D 0D | | 00AE 5C | INCB |
| 006E 7E | A | 00B7 54 | |
| 0077 18 | CB #8 | 009B 4D | LAI #D |
| 005B 7B | IOA | 008D 5C | X |
| 004D B5 | TM D5 | 00A6 5C | INCB |
| 0066 70 | SOS | 00B3 54 | |
| 0073 71 | ROS | 0099 4B | LAI #B |
| 0059 8D | TM D3 | 00AC 5C | X |
| 006C F8 | T047 | 0096 5C | INCB |
| 0056 10 | LB #8 | 00AB 54 | |
| 006B 49 | LAI #9 | 0095 47 | LAI #7 |
| 0055 74 | XAS | 00AA 54 | XNSK |

TABLE I-continued
PROGRAM LISTING

| | | | |
|---|---|---|---|
| 006A 40 | LAI #0 | 00B5 C4 | T CTAU |
| 0075 00 | NOP | 00BA OE | EOB #6 |
| 007A 3A | TL SRTO | 00BD 40 A13 | LAI #0 |
| 007D D5 | | 00BE 54 | XNSK |
| 007E 03 WASYN | INTOH | 00BF C2 | T A13 |
| 007F C1 | T WASYN | 009F 3E | TL WASYN |
| 005F 9A | TM D4 | 008F C1 | |
| 004F FF | T SYST | 00C0 03 SRT1 | INTOH ! WORDS 1-1 |
| | STOP | 00E0 FF | T SRT1 |
| 047 41 | LAI #1 | 00D0 04 | INTIL |
| 043 7B | IOA | 00C8 2D | IOS |
| 041 E9 | T056 | 00C4 7A | XAB |

COLUMN III | COLUMN IV

| Machine Code (address, command) | Instruction Code (assembly language) | Machine Code (address, command) | Instruction Code (assembly language) |
|---|---|---|---|
| 00C2 76 | LBA | 0114 7A | XAB |
| 00E1 61 | AISK #1 | 010A 73 | OX |
| 00F0 CA | T IBU | 0125 70 | SOS |
| 00D8 0A SRT 3 | EOB #2 | 0132 7A | XAB |
| 00CC 5C | X | 0139 41 | LAI #1 |
| 00C6 7A | XAB | 013C 7E | A |
| 00E3 00 | NOP | 011E 5C | X |
| 00D1 71 | ROS | 012F 49 | LAI #9 |
| 00E8 7A | XAB | 0117 74 | XAS |
| 00D4 03 | INTOH | 010B 07 GO2 | SAG |
| 00CA 3D | TL LTOF | 0105 50 | L |
| 00E5 FF | | 0122 77 | COM |
| 00F2 3B | TL LTON | 0131 7B | IOA |
| 00F9 FF | | 0138 6F | AISK #F |
| 00FC 03 SRT 2 | INTOH | 011C DB | T GO5 |
| 00DE C3 | T SRT 2 | 010E 27 | RB 4 |
| 00EF 7A | XAB | 0127 00 | NOP |
| 00D7 04 | INTIL | 0113 3C | TL SRT1 |
| 00CB 2D | IOS | 0109 FF | |
| 00C5 76 | LBA | 0124 00 GO5 | NOP |
| 00E2 61 | AISK #1 | 0112 00 | NOP |
| 00F1 3E | TL SYST | 0129 3C | TL SRT1 |
| 00F8 FF | | 0134 FF | |
| 00DC OE | EOB #6 | 011A 07 ONNR | SAG |
| 00CE 5C | X | 012D 50 | L |
| 00E7 7A | XAB | 0136 79 | XAX |
| 00D3 07 | SAG | 013B 00 | NOP |
| 00C9 71 | ROS | 011D 00 | NOP |
| 00E4 7A | XAB | 012E 0A | EOB #2 |
| 00D2 03 | INTOH | 0137 50 | L |
| 00E9 39 | TL OFLT | 011B 0A | EOB #2 |
| 00F4 FF | | 010D 7A | XAB |
| 00DA 3A | TL ONLT | 0126 73 | OX |
| 00ED FF | | 0133 70 | SOS |
| 00F6 4F OFNR | LAI #F | 0119 7A | XAB |
| 00FB 00 | NOP | 012C 0D | EOB #5 |
| 00DD 79 | XAX | 0116 20 | SB 1 |
| 00EE 0A | EOB #2 | 012B 0D | EOB #5 |
| 00F7 50 | L | 0115 F4 | T GO2 |
| 00DB 0A | EOB #2 | 012A 4F NR1 | LAI #F |
| ooSD 7A | XAB | 0140 5C ONLT | X |
| 00E6 73 | OX | 0160 OE | EOB #6 |
| 00F3 70 | SOS | 0150 76 | LBA |
| 00D9 7A | XAB | 0148 2B | SKBF #4 |
| 00EC 0D | EOB #5 | 0144 3A | TL NRON |
| 00D6 24 | RB 1 | 0142 E5 | |
| 00EB 0D | EOB #5 | 0161 07 | SAG |
| 00D5 3D | TL GO3 | 0170 50 | L |
| 00EA CE | | 0158 79 | XAX |
| 00F5 00 IBU | NOP | 014C 40 | LAI #0 |
| 00FA 00 | NOP | 0146 74 | XAS |
| 00FD 13 | LB #3 | 0163 OE | EOB #6 |
| 00FE 00 | NOP | 0151 50 | L |
| 00FF 71 | ROS | 0168 OE | EOB #6 |
| 00DF 03 | INTOH | 0154 7A | XAB |
| 00CF 38 | TL LOF1 | 014A 73 | OX |
| 00C3 38 | TL LON1 | 00C1 FF | |
| 0100 5C LTON | X | 0165 70 | SOS |
| 0120 0A | EOB #2 | 0172 7A | XAB |
| 0110 76 | LBA | 0179 41 | LAI #1 |
| 0108 2B | SKBF #4 | 017C 7E | A |
| 0104 3B | TL ONNR | 015E 5C | X |
| 0102 E5 | | 016F 49 | LAI #9 |
| 0121 07 | SAG | 0157 74 | XAS |

TABLE I-continued

PROGRAM LISTING

| | | | |
|---|---|---|---|
| 0130 50 | L | 014B 07 G022 | SAG |
| 0118 79 | XAX | 0145 50 | L |
| 010C 40 | LAI #0 | 0162 77 | COM |
| 0106 74 | XAS | 0171 7B | IOA |
| 0123 0A | EOB #2 | 0178 6F | AISK #F |
| 0111 50 | L | 015C DB | T GO25 |
| 0128 0A | EOB #2 | 014E 27 | RB 4 |

| COLUMN V | | COLUMN VI | |
|---|---|---|---|
| Machine Code (address, command) | Instruction Code (assembly language) | Machine Code (address, command) | Instruction Code (assembly language) |
| 0167 00 | NOP | 0134 00 GO24 | NOP |
| 0153 3C | TL SRT2 | 019A 00 | NOP |
| 0149 C3 | | 01AD 3C | TL SRT2 |
| 0164 00 G025 | | 0186 C3 | |
| 0152 00 | NOP | 01BB 4F NROF | LAI #F |
| 0169 3C | TL SRT2 | 019D 00 | NOP |
| 0174 C3 | | 01AE 79 | XAX |
| 015A 07 NRON | SAG | 01B7 00 | NOP |
| 016D 50 | L | 019B 00 | NOP |
| 0176 79 | XAX | 018D OE | EOB #6 |
| 017B 00 | NOP | 01A6 50 | L |
| 015D 00 | NOP | 0183 OE | EOB #6 |
| 016E OE | EOB #6 | 0199 7A | XAB |
| 0177 50 | L | 01AC 73 | OX |
| 015B OE | EOB #6 | 0196 70 | SOS |
| 014D 7A | XAB | 01AB 7A | XAB |
| 0166 73 | OX | 0195 00 | NOP |
| 0173 70 | SOS | 01AA 00 | NOP |
| 0159 7A | XAB | 01B5 00 | NOP |
| 016C 00 | NOP | 01BA CE | T GO23 |
| 0156 00 | NOP | 01C0 10 LON1 | LBL #10 |
| 016B 00 | NOP | 01E0 09 | |
| 0155 F4 | T GO22 | 01D0 2B | SKBF 4 |
| 0135 00 | NOP | 01C8 38 | TL NR2 |
| 013A 79 | XAX | 01C4 F6 | |
| 013D 14 | LB #4 | 01C2 07 | SAG |
| 013E 73 | OX | 01E1 50 | L |
| 013F 70 | SOS | 01F0 79 | XAX |
| 011F 10 | LBL #10 | 01D8 14 | LB #4 |
| 010F 09 | | 01CC 73 | OX |
| 0107 AB | TM D6 | 01C6 40 | LAI #0 |
| 0103 38 | TL G015 | 01E3 74 | XAS |
| 0101 DO | | 01D1 70 | SOS |
| 0180 00 OFL | NOP | 01E8 10 | LBL #10 |
| 01A0 00 | NOP | 01D4 09 | |
| 0190 00 | NOP | 01CA 8D | TM D3 |
| 0188 5C | X | 01E5 41 GO 14 | LAI #1 |
| 0184 OE | EOB #6 | 01F2 7E | A |
| 0182 76 | LBA | 01F9 5C | X |
| 01A1 2B | SKBF #4 | 01FC 49 | LAI #9 |
| 01B0 39 | TL NROF | 01DE 74 | XAS |
| 0198 C4 | | 01EF 07 GO 15 | SAG |
| 018C 4F | LAI #F | 01D7 50 | L |
| 0186 79 | XAX | 01CB 77 | COM |
| 01A3 OE | EOB #6 | 01C5 7B | IOA |
| 0191 40 | LAI #0 | 01E2 6F | AISK #F |
| 01A8 74 | XAS | 01F1 EC | T GO 16 |
| 0194 50 | L | 01F8 27 | RB 4 |
| 018A OE | EOB #6 | 01DC 00 | NOP |
| 01A5 7A | XAB | 01CE 3C GO 17 | TL SRT2 |
| 01B2 73 | OX | 01E7 C3 | |
| 01B9 70 | SOS | 01D3 F1 GO 16 | T GO 17 |
| 01BC 7A | XAB | 01C9 07 NR2 | SAG |
| 019E 00 | NOP | 01E4 50 | L |
| 01AF 41 | LAI #1 | 01D2 79 | XAX |
| 0197 7E | A | 01E9 14 | LB #4 |
| 018B 5C | X | 01F4 73 | OX |
| 0185 49 | LAI #9 | 01DA 70 | SOS |
| 01A2 74 | XAS | 01ED 10 | LBL #10 |
| 01B1 07 GO23 | SAG | 01F6 09 | |
| 01B8 50 | L | 01FB AE | TM D8 |
| 019C 77 | COM | 01DD DO | T GO 15 |
| 018E 7B | IOA | 01EE 00 LOFI | NOP |
| 01A7 6F | AISK #F | 01F7 00 | NOP |
| 0193 CB | T GO 24 | 01DB 00 | NOP |
| 0189 27 | RB 4 | 01CD 10 | LBL #10 |
| 01A4 00 | NOP | 01E6 09 | |
| 0192 3C | TL SRT2 | 01F3 2B | SKBF 4 |
| 01A9 C3 | | 01D9 3B | TL NR1 |

TABLE I-continued
PROGRAM LISTING

| Machine Code | Instruction Code |
|---|---|
| 01EC D5 | |
| 01D6 4F | LAI #F |
| 01EB 00 | NOP |
| 01D5 79 | XAX |
| 01EA 14 | LB #4 |

| COLUMN VII | | COLUMN VIII | |
|---|---|---|---|
| Machine Code (address, command) | Instruction Code (assembly language) | Machine Code (address, command) | Instruction Code (assembly language) |
| 01AC 73 | OX | 064D 5C | INCB |
| 0196 70 | SOS | 0666 5C | |
| 01AB 7A | XAB | 0673 30 | SKBEI #8 |
| 0195 00 | NOP | 0695 48 | |
| 01AA 00 | NOP | 066C C8 | T A9 |
| 01B5 00 | NOP | 0656 46 A11 | LAI #6 |
| 01BA CE | T GO 23 | 066B 5C | X |
| 01F5 73 | OX | 0655 5C | INCB |
| 01FA 40 | LAI #0 | 066A 54 | |
| 01FD 74 | XAS | 0675 30 | SKBEI #C |
| 01FE 70 | SOS | 067A 4C | |
| 01FF 10 | LBL #10 | 067D E9 | T A11 |
| 01DF 09 | | 067E 47 A12 | LAI #7 |
| 01CF 00 | NOP | 067F 54 | XNSK |
| 01C7 00 | NOP | 065F C1 | T A12 |
| 01C3 38 | TL GO 14 | 064F 0C | EOB |
| 01C1 DA | | 0643 C4 | |
| | | 0647 3D | TL CTAU |
| 03C0 00 | NOP | | |
| 03E0 19 | LB #9 | 07C0 00 D20 | NOP |
| 03D0 00 | NOP | 07E0 00 D19 | NOP |
| 03C8 30 | TLB SET | 07D0 00 D18 | NOP |
| 03C4 36 | | 07C8 00 D17 | NOP |
| 03C2 FF | | 07C4 00 D16 | NOP |
| | | 07C2 00 D15 | NOP |
| 0640 49 SET | LAI #9 | 07E1 00 D14 | NOP |
| 0660 74 | XAS | 07F0 00 D13 | NOP |
| 0650 10 | LB #0 | 07D8 00 D12 | NOP |
| 0648 48 A1 | LAI #8 | 07CC 00 D11 | NOP |
| 0644 54 | XNSK | 07C6 00 D10 | NOP |
| 0642 F7 | T A1 | 07E3 00 D 9 | NOP |
| 0661 09 | EOB #1 | 07D1 00 D 8 | NOP |
| 0670 48 A2 | LAI #8 | 07E8 00 D 7 | NOP |
| 0658 54 | XNSK | 07D4 00 D 6 | NOP |
| 0642 CF | T A2 | 07CA 00 D 5 | NOP |
| 0646 0B | EOB #3 | | 07E5 00 D 4 NOP |
| 0663 40 A3 | LAI #0 | 07F2 00 D 3 | NOP |
| 0651 5C | X | 07F9 2F D 2 | RT |
| 0668 5C | INCB | | |
| 0654 54 | | | |
| 064A 30 | SKBEI #4 | | |
| 0665 44 | | | |
| 0672 DC | T A3 | | |
| 0679 41 A4 | LAI #1 | | |
| 067C 5C | X | | |
| 065E 5C | INCB | | |
| 066F 54 | | | |
| 0657 30 | SKBEI #8 | | |
| 064B 48 | | | |
| 0645 C6 | T A4 | | |
| 0662 42 A5 | LAI #2 | | |
| 0671 5C | X | | |
| 0678 5C | INCB | | |
| 065C 54 | | | |
| 064E 30 | SKBEI #C | | |
| 0677 4C | | | |
| 0653 DD | T A5 | | |
| 0649 43 A6 | LAI #3 | | |
| 0664 54 | XNSK | | |
| 0652 F6 | T A6 | | |
| 0669 0D | EOB #5 | | |
| 0674 44 A8 | LAI #4 | | |
| 065A 5C | X | | |
| 066D 5C | INCB | | |
| 0676 54 | | | |
| 067B 30 | SKBEI #4 | | |
| 065D 44 | | | |
| 066E CB | T A8 | | |
| 0677 45 A9 | LAI #5 | | |

TABLE I-continued

PROGRAM LISTING 065B 5C        X

Illustrative Operation of Key Telephone Set

C.O. Line Selection

Central Office line selection is accomplished with the key telephone set of the invention by depressing a key labeled as a C.O. line which occupies one of the switch points of the matrix illustrated in FIG. 5. For example, if it were decided to initiate or answer a call on C.O. line 1, the key associated with C.O. line 1 is depressed (FIG. 7, column 1, row 1). The key associated with column 1, row 1 is associated with the fourth word in the time-division multiplex (TDM) word sequence (see FIG. 3). Thus, depression of the key associated with word 4 is sensed by the computer in the key telephone set which causes a response in the segment T4 of word 4 to be transmitted to the KSU.

The KSU interprets a pulse present in time segment T4 of word 4 as a request for service on C.O. line 1, and then accesses C.O. line 1 and connects the talk path of the key telephone set seeking service to C.O. line 1. The KSU then transmits a pulse during time segment T2 of word 4 (in other words, there is a "wide" pulse during time segment T1 and T2 of word 4) which is applied to the data path (e.g., see FIG. 2) to the key telephone set seeking service. The stored programmed computer in the key telephone set responds to the pulse in T2 of word 4 by generating signals to the interface circuitry associated with the LED matrix (see FIG. 6) to illuminate the LED in proximity with the key which is labeled C.O. line 1. At the same time, the digital computer in the key telephone set causes the C.O. line audio path to be connected directly through the "A" path back to the hybrid network of the handset. If the user of the key telephone set desired to talk over the speakerphone built into his set, he would have depressed the speakerphone key (column 4, row 4 of the switch matrix illustrated in FIG. 5 or 7) which causes the "A" path in the telephone set to be connected to the speakerphone speaker and microphone rather than to the handset hybrid network (see FIG. 8). Thus, either the speakerphone or the handset may be used to access a C.O. line, either when initiating a C.O. line call or when accessing a particular C.O. line in response to an incoming call.

Hold Key

A selected C.O. line is placed on "hold" after it has been selected, by depressing the hold key. Any key of the key matrix of the keyboard may be designated the hold key. However, in the illustrative embodiment of this invention as shown in FIG. 7, the hold key is located in column 1, row 4, which corresponds to word 7 of the data message. A depression of the hold key is sensed by the programmed digital computer in the key telephone set which generates a pulse in time element T4 of word 7, which is transmitted to the KSU. The KSU, on receiving the pulse in time element T4 in word 7, disconnects the key telephone set communication path from the C.O. line in use and connects a hold circuit to that C.O. line. A subsequent depression of the key associated with the C.O. line placed on hold causes a pulse in element T4 of the word associated with that C.O. line to be transmitted to the KSU, which disconnects the hold circuit, and re-establishes the connection between the C.O. line and the key telephone set.

Lamp Indications

Each of the LEDs associated with the C.O. line keys are controlled by the KSU to indicate the status of any line. If a call is being received on a particular C.O. line, the KSU transmits a pulse during time element T2 of the word associated with that C.O. line for each message for one second of time. During the following second, no pulses are transmitted during time element T2. During the subsequent second, pulses in T2 of the word are again transmitted, and so on. In this way, the LED associated with the C.O. line appears to be continuously illuminated for one second, completely off for one second, continuously illuminated for one second, etc.

Once the C.O. line is accessed by a key telephone set, the KSU sends a pulse during T2 of the word associated with that C.O. line during each message, with the result that the LED is illuminated once each message unit, appearing to the human eye that the LED is continuously illuminated.

If a C.O. line is placed on hold, as described previously, the LED associated with that line is "flashed" by illuminating the LED for seven-tenths of a second, not illuminating the LED for three-tenths of a second, illuminating the LED for seven-tenths of a second, and so on.

If a C.O. line is not receiving a call, is not accessed by a key telephone set, or is not placed on hold after having been first accessed, then the LED associated with that line is not illuminated. The LED or lamp indications described above are repeated to each key telephone set in the key telephone system. Each key telephone set receives its information regarding the illumination of the LED in the word associated with the C.O. line being used.

Exclusion/Privacy Release

Once a C.O. line has been accessed, the LED associated with that line is illuminated at each key telephone set in the key telephone system as an indication to other users of the system that the C.O. line is in use. If a second user of the system were to depress the key associated with the line in use, e.g., the key labeled "C.O. Line 1" of FIG. 7, the second user would not gain access to C.O. line 1. Even though the microcomputer in the second key telephone set transmits an "access bit" in T4 of word 4 in the message to the KSU, the KSU would recognize that C.O. line 1 is already in use, and not connect the communication path of the second telephone set to C.O. line 1. The second key telephone set is excluded by logic circuitry in the key service unit.

If the user of the key telephone set which has access to C.O. line 1, for example, desires that the user of another key telephone set in the system have simultaneous access to C.O. line 1, he may depress the privacy release key (column 2, row 4 of FIG. 7) which corresponds to word eleven in the illustrative embodiment of this invention. Depression of the privacy release key causes the microcomputer in the key telephone set having first access to C.O. line 1 to issue a response bit in word eleven. The KSU interprets the response bit in word eleven from the first accessing telephone set as a command to override the exclusion feature for C.O. line 1. A user of a second key telephone set may depress his key labeled C.O. line 1 and gain simultaneous use to C.O. line 1 with the first key telephone set. Any number of other key telephone sets may gain access to the line as long as the first user or any other user (but only one) continues to depress his privacy release key.

Conferencing Two C.O. Lines to One Station Set

To establish a conference call condition with two C.O. lines, the key telephone set user must first access an idle line. For example, the user would access C.O. line 1, which is located in column 1, row 1 and associated with word 4 (FIG. 7). When the user depresses the C.O. line 1 key, a response bit in T4, word 4 is generated by the microcomputer in the key telephone set and transmitted to the KSU. The KSU interprets the bit in T4 as a service request on that line and provides access to that line by connecting the C.O. line to the communication path of the key telephone set. Once the user has access to C.O. line 1, he may then depress the hold key which is shown in column 1, row 4 (FIG. 7). Depressing the hold key causes a signal to be transmitted to the KSU requesting that a hold circuit be connected to C.O. line 1.

Once the C.O. line 1 is on hold, the user may depress, for example, the C.O. line 2 key, which is located at column 2, row 1 of the illustrative key arrangement of FIG. 7. The KSU provides access to C.O. line 2. Line 2 is associated with word 8 in the message, so by depressing the C.O. line 2 key, a response bit in T4 word 8 is transmitted to the KSU. Next, the user places line 2 on hold as described above and with both lines on hold, the user depresses both keys (C.O. line 1, and C.O. line 2) simultaneously. Depressing both keys simultaneously generates a response bit in T4 word 4 and a response bit in T4, word 8. The microcomputer recognizes that both keys are depressed and transmits both of them to the KSU. The KSU on receiving simultaneous bits in T4 in words 4 and 8 after being in the hold condition recognizes that a request is for access to two lines at the same time, and provides a conference connection of the key telephone set between both C.O. lines and the one talk path of the key telephone set. Thus, two parties on different C.O. lines may be tied to the talk path of one key telephone set with the key telephone set of this invention.

Use of the Speakerphone

In the key telephone system described herein, the "A" pair is associated with C.O. lines; the "B" pair is associated with incoming intercom calls. A user may communicate via the handset or the speakerphone unit. To connect the "A" pair to the speakerphone unit, the speakerphone unit may be accessed by depressing the speakerphone on/off key which is shown in an illustrative embodiment in FIG. 8, at column 4, row 4. By depressing speakerphone on/off key, the microcomputer senses that the key is down and issues a response bit in T4 of word 19, which the KSU recognizes as a "speakerphone on" request. The KSU then transmits back to the key telephone set a pulse during T2 of word 19. This T1, T2 transmission during word 19 is recognized by the microcomputer in the key telephone set which responds by illuminating the LED which appears with the key of column 4, row 4, the "speakerphone on" key. The steadily illuminated LED indicates that the speakerphone is on. The KSU also issues a T2 pulse during word 3, a control word to be described immediately below. This "word 3" control bit received in the key telephone set is interpreted by the microcomputer of the key telephone set as a command to effect the switching indicated in FIG. 8 and tie the speakerphone unit 32 to the "A" pair. The talk path on the "A" pair is disconnected from the handset hybrid network (which is normally connected to the "A" pair) and connected to the speakerphone unit. The speakerphone unit is disconnected by depressing the speakerphone on/off key once more.

Control Words 0–3

Three control bits may be transmitted to the KSU from the key telephone set for the purpose of controlling auxiliary equipment or providing error control. Background music transmission to the key telephone set is controlled via a switch located at column 0, row 2 of the switch matrix, the key which activates the switch being labeled "background music" in FIG. 7. This switch is a latching switch to signal the KSU that the key telephone set does or does not desire background music. When the microcomputer detects that that switch is closed, it issues a response bit during T4 of word 1. As indicated in FIG. 7, the background music switch is associated with word 1. The KSU interprets this response bit during T4 of word 1 as a command to disconnect the music source from the key telephone sets "B" path.

The second control bit is associated with word 2 of the data message and informs the KSU of the depression of any key of the columns 1–7 by rows 1–4 matrix. This "release mechanism" bit is generated physically in the key telephone set because there is a second physical contact (other than the prime contactor) associated with each of the 28 keys of the columns 1–7 and rows 1–4. These second contactors are all connected in parallel creating a connection appearing as if there were only one switch across in the switch matrix, column 0, row 3. If any key in the key matrix is depressed, one of these switches would be closed, closing the contacts in column 0, row 3. The KSU uses the pulse in word 2 for error control to verify that some other key is being depressed.

Station Set Dialing

After a C.O. line has been accessed, there is a need to accomplish dialing. There are two basic methods of signalling another telephone. The first method is outpulse signalling or pulse dialing. The second method is frequency signalling. The outpulse method of dialing can be accomplished through the use of a rotary outpulse dial where a switch or contact is opened and closed as the dial rotates back to its original position after a dial pull. A modern approach of outpulse dialing provides electronic circuitry which outputs pulses in response to a key depression on a key pad. The key telephone set of this invention accommodates either type of outpulse dial through the dial interface circuitry to the microcomputer.

The microcomputer recognizes that a pulse is present and transmits during T2 a hookswitch pulse (see FIG. 3B) whenever a dial pulse is present. The hookswitch pulse during T2 is generated during each word of the message stream. The existence of hookswitch pulses is sensed by the KSU as an indication that a dial pulse is being transmitted. At the termination of the pulse in the station set from the dial, the hookswitch pulses during T2 of each word are no longer transmitted. The absence of pulses indicates to the KSU that the dial pulse has terminated. When the next pulse starts, the hookswitch pulses are transmitted during T2 of each word again; when that pulse disappears they would be terminated again. Thus the KSU receives information regarding the number of dial pulses to be retransmitted via the C.O. line.

Frequency signalling is accomplished directly via the "A" path of the key telephone set to the C.O. line.

Flash

The key illustrated in FIG. 7 in row 4, column 3 is designated the "flash" key. The purpose of the flash key is to momentarily disconnect the C.O. line to which the key telephone set has been connected having to reseize the C.O. line. Operation of the flash key merely interrupts the line. When the key labelled "flash" is depressed, a pulse during T4 of word 15 (in the illustrative embodiment) is transmitted to the KSU. In response, the KSU momentarily interrupts the C.O. line to which the key telephone set had been connected. The C.O. line is interrupted for the duration of the time that the user depresses the flash key. There is no LED indication associated with the flash key. The main use for the flash key is to interrupt or "break" a seized C.O. line and restore dial tone on it in the event of a mis-dial or when completing a call and starting another call. Use of the flash key allows the dropping and reseizure of a C.O. line without any other acts by the operator.

Line Identification

In the preferred embodiment of this invention, non-latching keys are used which, because they do not stay depressed or latched after use, can cause the user of the key telephone set to become confused as to which line he was using. The key telephone set of this invention allows the user to depress the privacy release key which causes a 120 iteration per minute flash rate to flash the one or more lines that the user is using on his key telephone set. The flash rate is implemented by a flashing pulse transmission from the KSU to the user's key telephone set during the words associated with the lines in use at the user's key telephone set. The flashing pulse transmission is the same as for ordinary lamp flashes described previously. The microcomputer in the key telephone set interprets the alternating pulse transmission and issues the stimulus to light the appropriate LEDs associated with the lines in use at the flash rate. Thus, by depressing the privacy release key, the user may identify the lines that he is using because the LEDs associated with those lines are flashing. The LEDs also flash at 120 iterations per second for the lines which the user has put on hold. This LED identification is called "I HOLD."

Initiating an Intercom Call

With the key telephone set of this invention, two types of intercom calls may be initiated by the user of the key telephone set. It may be desired by the calling party that the called party answer on the called party's speakerphone set ("hands free answer"); alternatively, the calling party may desire that the called party answer the intercom call with the called party's handset ("handset answer"). The hands-free answer mode is initiated by the calling party by accessing the speakerphone of the called party and tying it to "A" talk path of the calling telephone. The calling party depresses the intercom call button which is located (FIG. 7 of the illustrative embodiment) in column 7, row 4 of the switch matrix. Upon recognizing that this key is down the microcomputer, transmits a pulse in T4 of word 31 to the KSU. When the KSU receives the pulse, it responds by transmitting a pulse during T2 of word 31 to illuminate the LED of column 7, row 4. Upon accessing the register in the KSU, the KSU connects a dial tone to the "A" talk path to the calling party which is heard via the speakerphone unit or the handset depending on whether or not the calling party has turned his speakerphone unit on. At this time the user dials the party he wishes to call with a simple two digit code (for example). In the answer "hands free" mode, an alert tone about one second duration is transmitted to the speaker of the speakerphone of the called telephone. This tone is heard by the calling party giving him a signal that he may begin his intercom message.

If the calling party desires that the called party not answer hands-free, for example when there are other individuals in the called party's room, the calling party may dial a prefix digit, and then the two digits of the key telephone set that he wishes to call and the call would be completed as described above. After dialing the prefix requesting the party to answer on the handset, the calling party would hear an intercom ringback tone over his speaker (or handset) which is a one second on, three seconds off multitone signal. When the called party answers, the ringback tone ceases.

Answering An Intercom Call

As indicated above, if the intercom call were placed by the calling party in the hands free answer mode, an alert tone is first transmitted to the called party's speaker. This tone, a one second signal tone, is immediately followed by connection of the talk path of the calling party to the speakerphone of the called party. The called party may respond to the calling party directly without touching the key telephone set. Also, when the call has been received, the KSU indicates that the call is an intercom call by transmitting a slow flash signal to the answer key. In the illustrative embodiment of this invention, the answer key is located in column 6, row 4 of the key matrix of FIG. 7 and is associated with word 27.

This flashing is accomplished as before by a T2 pulse transmission during the time when the LED is to be on and no T2 pulse transmission when the light is to be off. In this manner, the LED flashes at the answer key at, for example, a one second on, one second off flash rate. If the called party, although being called hands free, wishes to respond on the handset, he may depress his answer key, which as described above is associated with word 27. The depression of this key would be recognized by the key telephone set microcomputer, which transmits a response bit during T4 of word 27. The KSU recognizes this response pulse, issues a control bit during T2 of word 3 which would cause the called telephone set's microcomputer to connect the speakerphone unit to the "A" talk path, and connects the handset to the "B" talk path. Thus the "B" talk path would be tied to the handset, and the called party may talk via the handset. At this time, the KSU would also transmit a pulse during T2 of word 27, and the light under the answer key would now be on continuously.

If the calling party had requested handset only answer (by dialing a prefix digit code) then the speaker of the speakerphone of the called party would then receive a ring tone which is a two second on, one second off dual tone. The KSU would return a control pulse signal during interval T2 of word 0 which when received by the called key telephone set microcomputer, would close the bypass switch (FET 5 of FIG. 8) and allow this ring tone to be applied to the speaker only with no microphone return. Upon hearing the tone, the called party would then also see the LED of the answer key which would be caused to flash at the answer key as previously described. The called party depresses the answer key, and the KSU responds with a pulse during T2 of word 3 and a T2 pulse during word 27. As before, the speakerphone of the called telephone is connected to the "A" path, the handset is tied to the "B" path, and the called party would have to talk on the handset. This action is similar to the answering hands-free case, but it is the only method of answering if called with a handset only prefix. The called party may always use the handset to talk on the intercom call, by depressing his answer key.

Hot Line Intercom Call

A hot line intercom call is a direct call with no dialing required. The hot line key may be placed anywhere in the switch matrix that is not used for C.O. lines or other feature keys. In the illustrative embodiment of this invention, the hot line key is at column 5, row 4 (FIG. 5). A calling party would depress the hot line button, and the microcomputer of the calling set would respond by transmitting a response bit during T4 of word 23. The KSU would recognize this signal and without any dialing by the calling set, connect the calling key telephone set to the "B" talk path of the key telephone set connected to the hot line. The called set would be in communication with the calling set hands free via the "B" path to the speakerphone of the called set. Of course, the called telephone may be answered on the handset as previously described by depressing the answer key.

The hot line key may be provided as a "latching" key by logically providing in the microcomputer that the key should be considered to be continually depressed until it is depressed a second time or if another key is depressed. With logical latching, the hot line provides two-way communication between the calling and called key telephones. For example, the secretary may have a hot line to her supervisor's telephone. The secretary depresses her hot line key which would then be connected directly into the supervisor's speakerphone. When the hot line key is depressed by the secretary, instructions in the microcomputer may be provided to place any calls that she had been on onto hold. If she answered a call for her supervisor in order to screen the call, she could press her hot line key to inform the supervisor of the call and simultaneously that line would automatically go on hold. The hot line key may be provided as a simple hold-down key, where after it is released nothing would be heard by the called party via the hot line.

Direct Station Selection

A direct station selection key is a special case of the hot line above described. An auxiliary console or a control panel is provided at an operator's position in the system that has a key associated with each key telephone set in the system. These keys are hot lines into each station in the system. An operator may depress a key associated with a particular key telephone set in order to communicate via the speakerphone of the called key telephone set. The connection to each key telephone set is via the "B" talk path. Both the operator and called party may communicate hands-free.

Paging

A page key is provided in the illustrative embodiment of this invention. The page key is illustrated as a key in column 7, row 2 of the key matrix of FIG. 7 and is associated with word 29. When depressed, the page key causes a response pulse to be provided in T4 of word 29. The microcomputer transmits the response pulse to the KSU which then activates a hot line connection to a predetermined number of key telephones in the key telephone system. The KSU transmits to all connected key telephone systems a pulse during T2 of word 0. The microcomputer of each key telephone set receiving the pulse generates a signal to close the by-pass switch (FIG. 8) and place path "B" directly to the person originating the page in a one-way manner where only the incoming voice may be heard. No response is permitted. Upon the completion of the page, the person originating the page releases the page key and the page connection is disconnected.

Do Not Disturb

A "Do Not Disturb" key is illustrated in column 7, row 3 and is associated with word 30. When the Do Not Disturb key is depressed, a pulse is generated by the microcomputer during T4 of word 30. The KSU receives the pulse and then transmits a T2 pulse during word 30. The microcomputer in the key telephone set in response generates a pulse to illuminate the LED associated with the Do Not Disturb key. In the Do Not Disturb mode, the "B" talk path is put in the busy state for all intercom mode calls trying to access the key telephone set. Certain types of calls such as hot line and DSS calls are allowed access. Page calls are "busyed out" as are any dial intercom calls.

The advantages of the present invention, as well as certain changes and modifications to the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

What is claimed is:

1. In a key telephone system having a key service unit for connecting a number of central office lines to a plurality of key telephone station sets and for providing switching control and signalling functions in the key telephone system, at least one key telephone station set comprising:
   a plurality of switch means operative, when actuated, to generate status signals indicative of desired key telephone services,
   at least one conversion means for converting sounds to audio frequency electrical signals and for converting audio frequency electrical signals into sounds,
   power receiving and distributing circuit means,
   signal receiving circuit means for receiving time-division multiplexed signals from the key service unit and transmitting said time-division multiplexed signals to a stored program digital computer means in said key telephone station set said stored program digital computer means for generating, in response to said status signals, further time-division multiplexed signals which periodically indicate the status of each of said switch means, and for generating communication circuit control signals in response to the time-division multiplexed signals from the key service unit, signal transmitting circuit means for receiving said further time-division multiplexed signals from said stored program digital computer means and transmitting said further time-division multiplexed signals to the key service unit, function control circuit means operative in response to said communication circuit control signals received from said stored program digital computer means to connect said at least one conversion means to either a first communication circuit or a second communication circuit, both said first and second communication circuits connecting said at least one key telephone station set to the key service unit through which said at least one key telephone station set may be connected to any of a plurality of telephone or intercom lines, and dial signalling means.

2. The key telephone station set according to claim 1, wherein said stored program digital computer means is further operative to generate indicator signals in response to the time-division multiplexed signals received from the key service unit, and said at least one key telephone station set further comprises:

a plurality of indicator means operative in response to said indicator signals to display the status of key telephone service features.

3. The key telephone station set of claim 2 wherein said plurality of switch means are arranged in rows and columns, a certain number of said switch means being closed only for the duration of depression of non-locking keys, at least one of said switch means being closed by means of a locking key.

4. The key telephone station set of claim 3 wherein one of said switch means closes each time one or more of the other switch means is closed.

5. The key telephone station set of claim 2 wherein one or more of said switch means is each uniquely dedicated to a particular central office line, for signaling that access to the particular central office line is desired.

6. The key telephone station set of claim 5 wherein one of said switch means is dedicated for signaling that an accessed central office line is to be placed on hold.

7. The key telephone station set of claim 5 wherein at least one of said switch means is dedicated for signaling that a second key telephone station set may obtain simultaneous access to a previously accessed central office line.

8. The key telephone station set of claim 2 wherein at least one of said switch means is dedicated for signaling that an intercom call will be initiated from said key telephone station set.

9. The key telephone station set of claim 6 wherein for two central office lines previously accessed and placed on hold, the simultaneous actuation of the switch means dedicated to said central office lines signals that both of said central office lines shall be simultaneously connected to said key telephone station set.

10. The key telephone station set of claim 2 further comprising another conversion means for converting sounds to audio frequency electrical signals and for converting audio frequency electrical signals into sounds, one of said conversion means being a hybrid network in a telephone handset, the other of said conversion means being a speakerphone, each of said conversion means being connected by said function control circuit means to either a first communication circuit or a second communication circuit in response to communication circuit control signals received by said function control circuit means from said stored program digital computer means.

11. The key telephone station set of claim 10 wherein central office line access is via said first communication circuit, intercom call initiation is via said first communication circuit, and intercom call reception is via said second communication circuit.

12. The key telephone station set of claim 10 wherein one of said switch means is dedicated for signaling that said speakerphone is to be connected to said first communication circuit and that said hybrid network in said telephone handset is to be connected to said second communication circuit.

13. The key telephone station set of claim 2 wherein at least one of said switch means is dedicated for signaling that a previously seized central office line is to be interrupted and then reseized without further signals from manipulation of the switch means associated with the central office line or the hookswitch.

14. The key telephone station set of claim 2 wherein said dial signaling means is a dial pulse signaling means for generating dial pulses, and wherein said dial pulses are sensed by said stored program digital computer means and transmitted to said central switching and control unit via a phantom digital data communication circuit.

15. The key telephone station set of claim 2 wherein said dial signaling means is a frequency signaling means for generating dual tone signals, and wherein said dual tone signals are transmitted to said central switching and control unit via said first communication circuit.

16. A key telephone station set comprising:

at least one conversion means for converting sounds to audio frequency electrical signals and for converting audio frequency electrical signals into sounds, a plurality of switches, each of said switches, when actuated, being operative to produce a signal indicative of a desired key telephone service, a plurality of visual indicating means, each associated with one of said switches, for indicating the status of the key telephone services associated with said switches, power receiving and distributing circuit means, signal receiving circuit means for receiving time-division multiplexed signals from a key service unit and transmitting said time-division multiplexed signals to a stored program digital computer means in said key telephone station set said stored program digital computer means for generating further time-division multiplexed signals which periodically indicate the status of each of said switches in response to the signals produced by said switches, and for receiving time-division multiplexed signals from said signal receiving circuit means and, in response thereto, controlling the illumination of each of said visual indicating means to provide a visual indication of the status of each of said switches and generating communication circuit control signals, signal transmitting circuit means for receiving said further time-division multiplexed signals from said stored program digital computer means and transmitting said further time-division multiplexed signals to the key service unit, function control circuit means operative in response to said communication circuit control signals received from said stored program digital computer means to connect said at least one conversion means to either a first communication circuit or a second communication circuit, both said first and second communication circuit connecting said key telephone station set to the key service unit through which said key telephone station set may be connected to any of a plurality of telephone or intercom lines, and dial signalling means.

17. The key telephone station set of claim 16, wherein one or more of said switches is each uniquely dedicated to a particular central office line for signalling that access to a particular central office line is desired, one of said switches is dedicated for signalling that an accessed central office line is to be placed on hold, and one of said switches is dedicated for signaling that a second key telephone station set may obtain simultaneous access to a previously accessed central office line.

18. The key telephone station set of claim 17 wherein each of said visual indicating means which is associated with a central office line is not illuminated when the associated central office line is not accessed, is apparently constantly illuminated when the associated central office line has been accessed, is apparently intermittently illuminated at a first rate when an incoming telephone call is being received on the associated central office line, and is apparently intermittently illuminated at a second rate when the associated said central office line is placed on hold.

19. The key telephone station set of claim 18 wherein said one of said switches dedicated for signalling that a second key telephone station set may obtain simultaneous access to a previously accessed central office lines is also dedicated for signalling a request for the apparent intermittent illumination at a third rate of all visual indicating means associated with switches and central office lines that have been accessed prior to their being placed on hold by the user of the key telephone station set.

20. The key telephone station set of claim 16 further comprising another conversion means for converting sounds to audio frequency electrical signals and for converting audio frequency electrical signals into sounds, one of said conversion means being a hybrid network in a telephone handset, the other of said conversion means being a speakerphone, each of said conversion means being connected by said function control circuit means to either a first communication circuit or a second communication circuit in response to communication circuit control signals received by said function control circuit means from said stored program digital computer means.

21. The key telephone station set of claim 20 wherein central office line access is via said first communication circuit, intercom call initiation is via said first communication circuit, and intercom call reception is via said second communication circuit.

22. The key telephone station set of claim 21 wherein one of said switches is an answer switch dedicated for signalling that an intercom call is to be answered via said hybrid network in said telephone handset and wherein the visual indicating means associated with said answer switch is illuminated to indicate hybrid network connection to said second communication circuit.

23. The key telephone station set of claim 21 wherein at least one of said switches is dedicated for signalling without dialing that a direct-line intercom call is to be initiated to another key telephone station set.

24. The key telephone station set of claim 21 wherein one of said switches is dedicated for signalling that a paging message is to be transmitted to other key telephone station sets.

25. The key telephone station set of claim 21 wherein one of said switches is dedicated as a do not disturb switch for signalling that dialed intercom calls via said second communication circuit must not have access to the key telephone station set, and wherein the visual indicating means associated with said do not disturb switch is illuminated during the time the key telephone station set is in the do not disturb status.

* * * * *